US009139060B2

(12) United States Patent
Armstrong et al.

(10) Patent No.: US 9,139,060 B2
(45) Date of Patent: Sep. 22, 2015

(54) TRAVEL TRAILER STABILIZER SYSTEM

(71) Applicants: Rocky E Armstrong, Morton, WA (US); David J Garcia, Morton, WA (US)

(72) Inventors: Rocky E Armstrong, Morton, WA (US); David J Garcia, Morton, WA (US)

( * ) Notice: Subject to any disclaimer, the term of this patent is extended or adjusted under 35 U.S.C. 154(b) by 0 days.

(21) Appl. No.: 14/461,386

(22) Filed: Aug. 16, 2014

(65) Prior Publication Data
US 2014/0353942 A1  Dec. 4, 2014

Related U.S. Application Data

(63) Continuation-in-part of application No. 13/898,456, filed on May 20, 2013.

(60) Provisional application No. 61/650,581, filed on May 23, 2012.

(51) Int. Cl.
*B60S 9/04* (2006.01)
*B60D 1/66* (2006.01)
*B60P 3/36* (2006.01)

(52) U.S. Cl.
CPC ... *B60D 1/66* (2013.01); *B60P 3/36* (2013.01); *B60S 9/04* (2013.01)

(58) Field of Classification Search
CPC ...... E02F 9/08; E02F 9/085; B60S 9/00–9/08
USPC .......................................... 254/418–420, 424
See application file for complete search history.

(56) References Cited

U.S. PATENT DOCUMENTS

| | | | | |
|---|---|---|---|---|
| 2,924,463 | A | | 2/1960 | Livermont |
| 2,979,304 | A | | 4/1961 | Teel |
| 3,253,839 | A | * | 5/1966 | Warren .......................... 254/419 |
| 3,367,614 | A | * | 2/1968 | Leonard ........................ 254/101 |
| 3,475,008 | A | * | 10/1969 | Taylor ............................ 254/424 |
| 3,558,092 | A | | 1/1971 | Hanson |
| 3,642,242 | A | | 2/1972 | Danekas |
| 3,690,694 | A | | 9/1972 | Herndon |
| 3,801,128 | A | | 4/1974 | Herndon |
| 3,823,958 | A | * | 7/1974 | Trejbal ....................... 280/763.1 |
| 3,933,372 | A | | 1/1976 | Herndon |
| 3,989,277 | A | * | 11/1976 | Stahl .......................... 280/764.1 |
| 4,268,066 | A | * | 5/1981 | Davis ......................... 280/763.1 |
| 4,461,491 | A | | 7/1984 | Eklund |
| 4,708,362 | A | * | 11/1987 | Raetz ........................ 280/763.1 |
| 5,575,492 | A | * | 11/1996 | Stone ............................ 280/475 |
| 5,628,521 | A | | 5/1997 | Schneider |
| 6,089,603 | A | * | 7/2000 | Ackley ....................... 280/765.1 |
| 6,142,488 | A | * | 11/2000 | Orr .......................... 280/6.153 |
| 6,224,102 | B1 | * | 5/2001 | Nebel ........................ 280/765.1 |
| 6,331,016 | B1 | * | 12/2001 | Wallace et al. ............. 280/763.1 |

(Continued)

OTHER PUBLICATIONS

Garcia, D., "Armstrong Innovation Stabilizer Set-up Instructions", Morton WA, published circa May 14, 2013.

*Primary Examiner* — Jeffrey J Restifo
*Assistant Examiner* — Erez Gurari
(74) *Attorney, Agent, or Firm* — Kal K Lambert; Lambert Patent Services

(57) ABSTRACT

A travel trailer stabilizing system having a right and left compound above-axle strut for bracing a trailer body at the axle or axles, each compound strut having an overlever arm for applying a stiffening force with a mechanical advantage to oppose any oscillatory motion of the frame on the tires. The mechanical advantage of the lever is configured to transfer a part of the weight of the trailer from the tires to the rigid struts.

23 Claims, 22 Drawing Sheets

(56) References Cited

U.S. PATENT DOCUMENTS

| | | | |
|---|---|---|---|
| 6,494,487 B1* | 12/2002 | Nebel | 280/765.1 |
| 6,827,335 B1* | 12/2004 | Medberry | 254/425 |
| 7,226,057 B2 | 6/2007 | Eichhorn | |
| 7,338,052 B2* | 3/2008 | Hanscom | 280/6.153 |
| 2005/0127341 A1* | 6/2005 | Jean | 254/126 |
| 2006/0017241 A1 | 1/2006 | Hanscom | |
| 2006/0081755 A1* | 4/2006 | Thorpe | 248/354.1 |
| 2007/0114734 A1* | 5/2007 | Jacques | 280/6.153 |
| 2007/0284499 A1* | 12/2007 | Hammac | 248/346.01 |
| 2007/0289439 A1* | 12/2007 | Sakada et al. | 92/52 |
| 2008/0217898 A1* | 9/2008 | Hanscom | 280/763.1 |
| 2009/0102176 A1 | 4/2009 | Garceau | |
| 2009/0200782 A1* | 8/2009 | Albrecht et al. | 280/763.1 |
| 2011/0163523 A1* | 7/2011 | Smith | 280/763.1 |
| 2011/0169231 A1 | 7/2011 | Tiedge | |
| 2012/0299279 A1* | 11/2012 | Borghi | 280/765.1 |
| 2013/0074377 A1* | 3/2013 | Colbert | 37/403 |
| 2013/0774377 | 3/2013 | Colbert | |

* cited by examiner

Fig. 1A
*(PRIOR ART)*
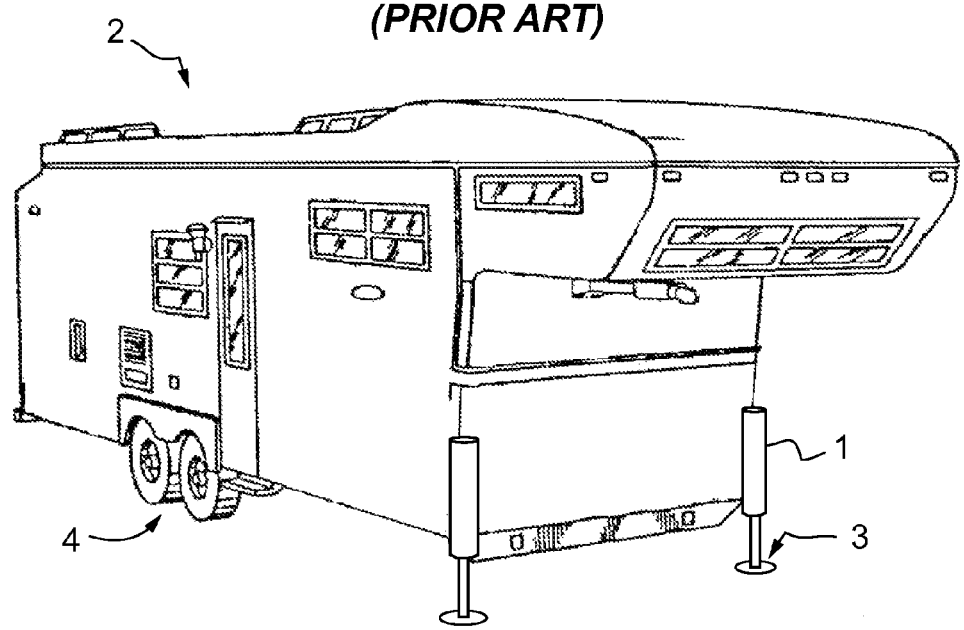
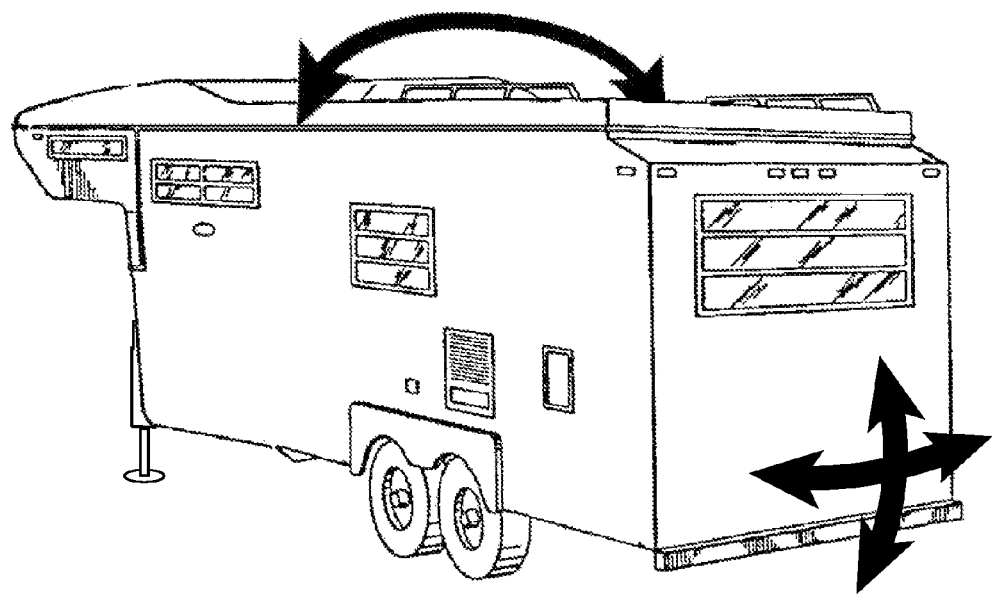
Fig. 1B
*(PRIOR ART)*

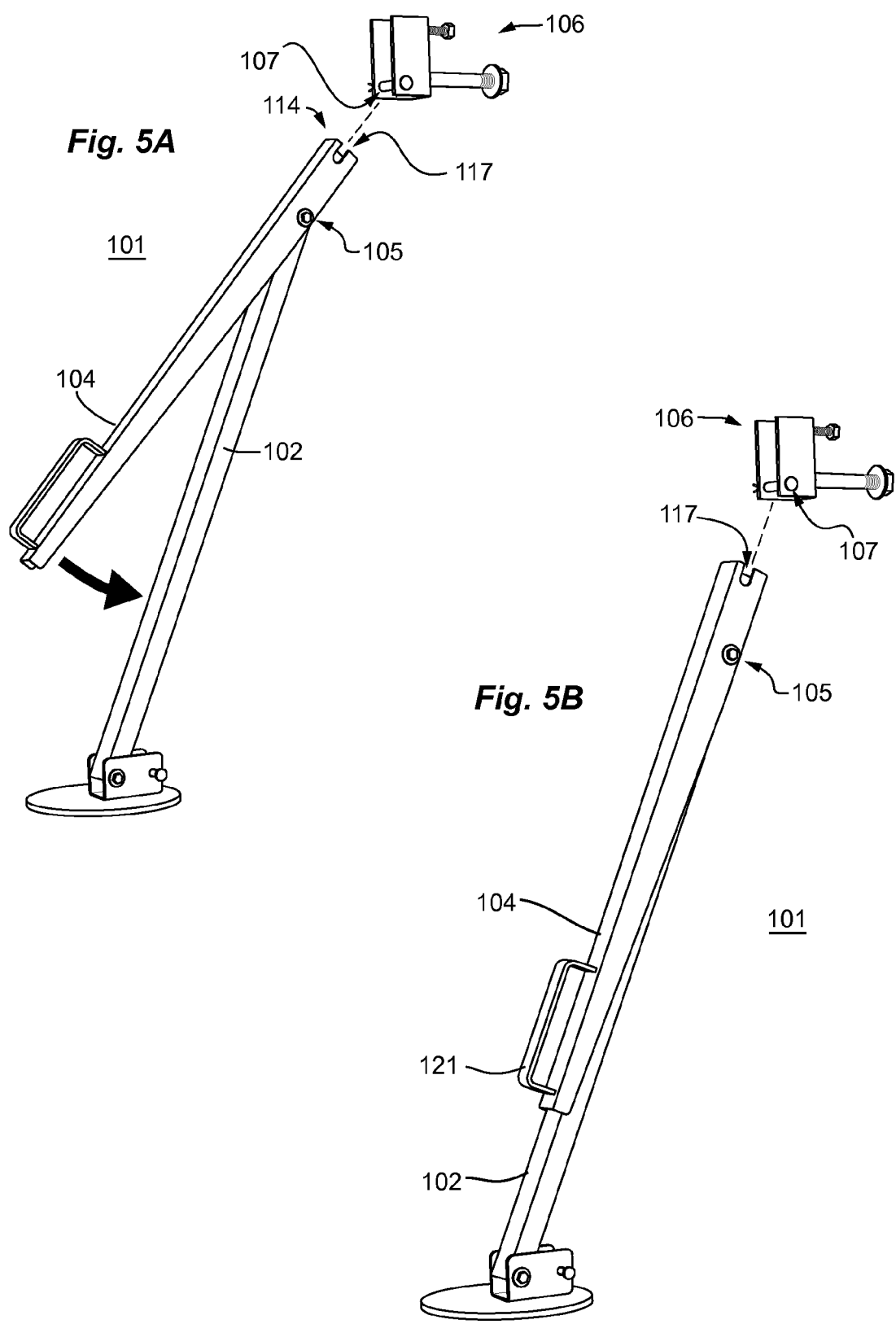

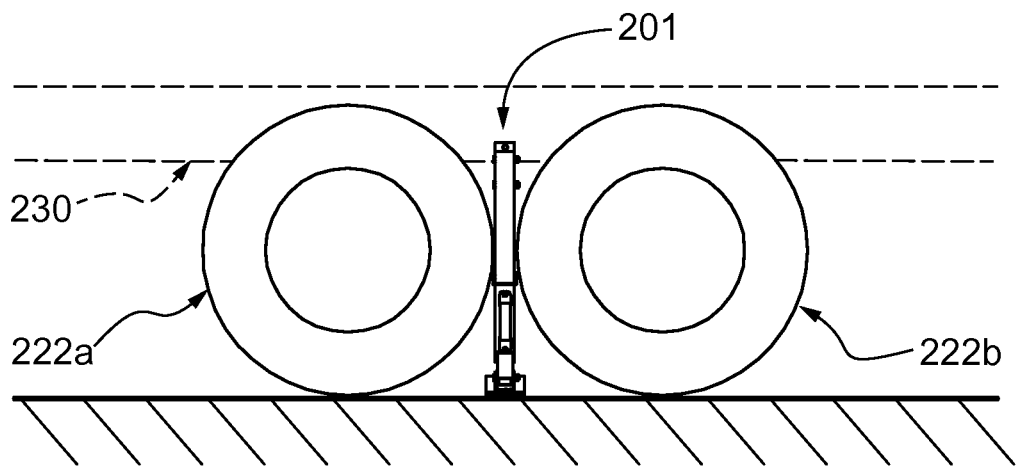
*Fig. 6*
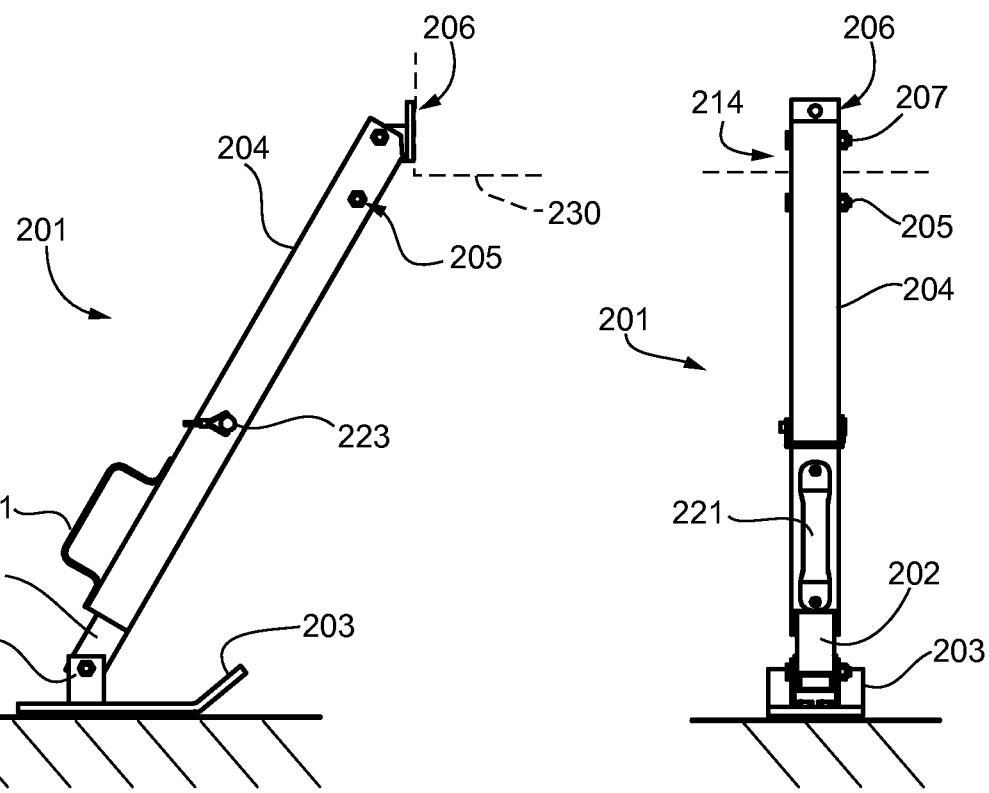
*Fig. 7A*  *Fig. 7B*

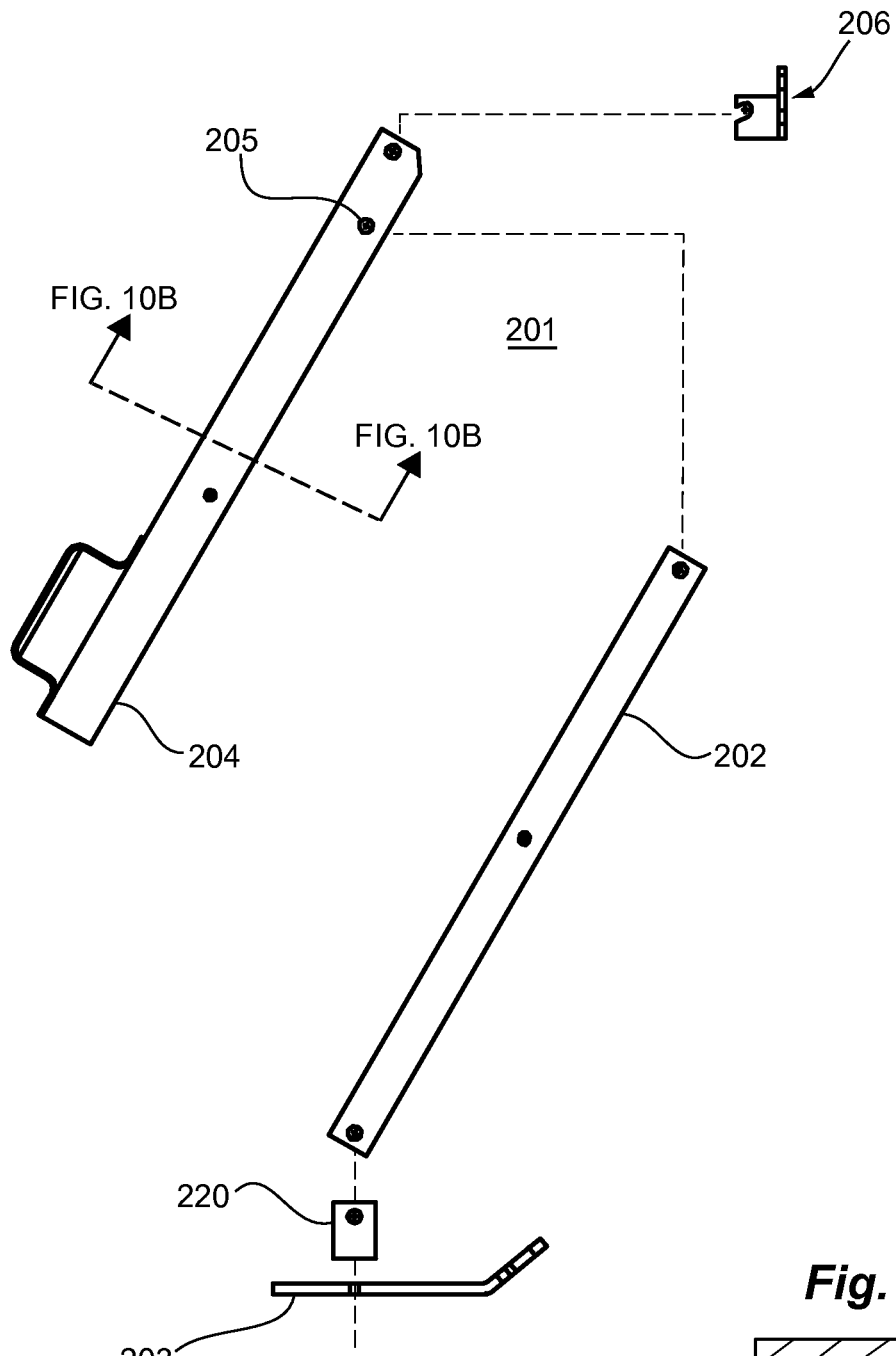
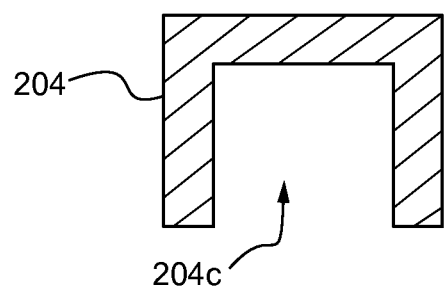

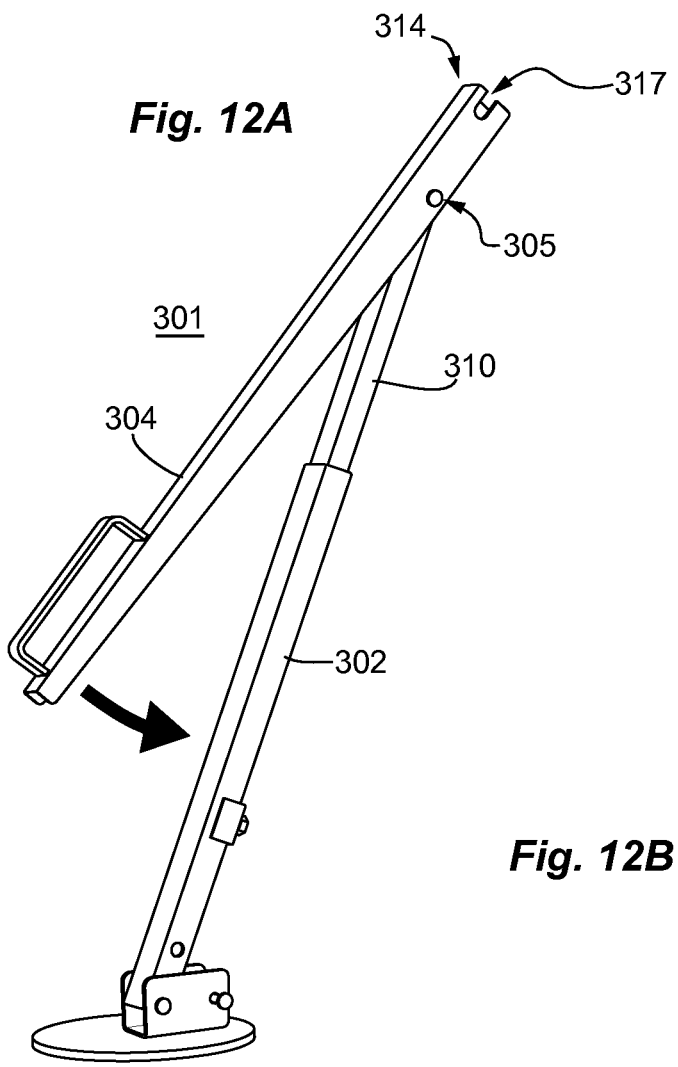
Fig. 12A
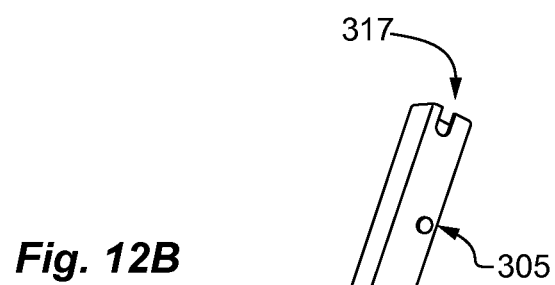
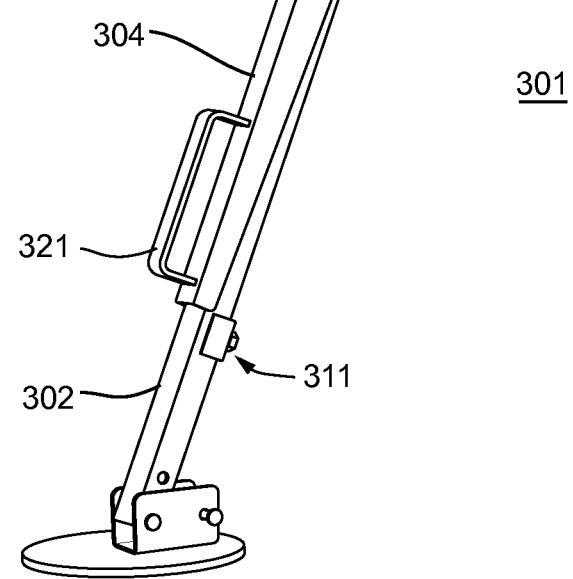
Fig. 12B

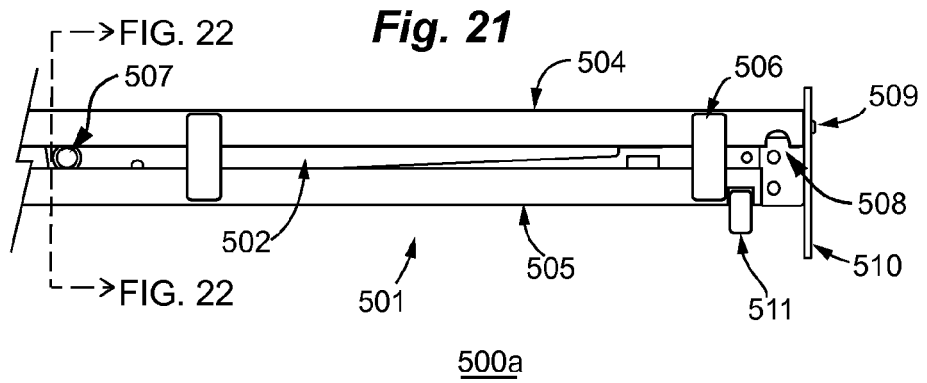
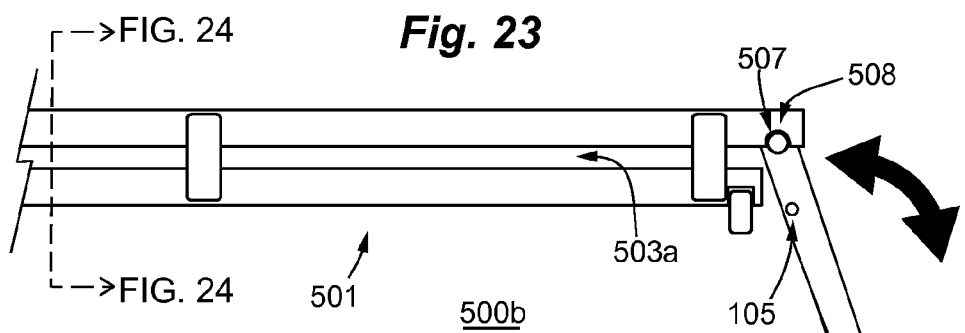
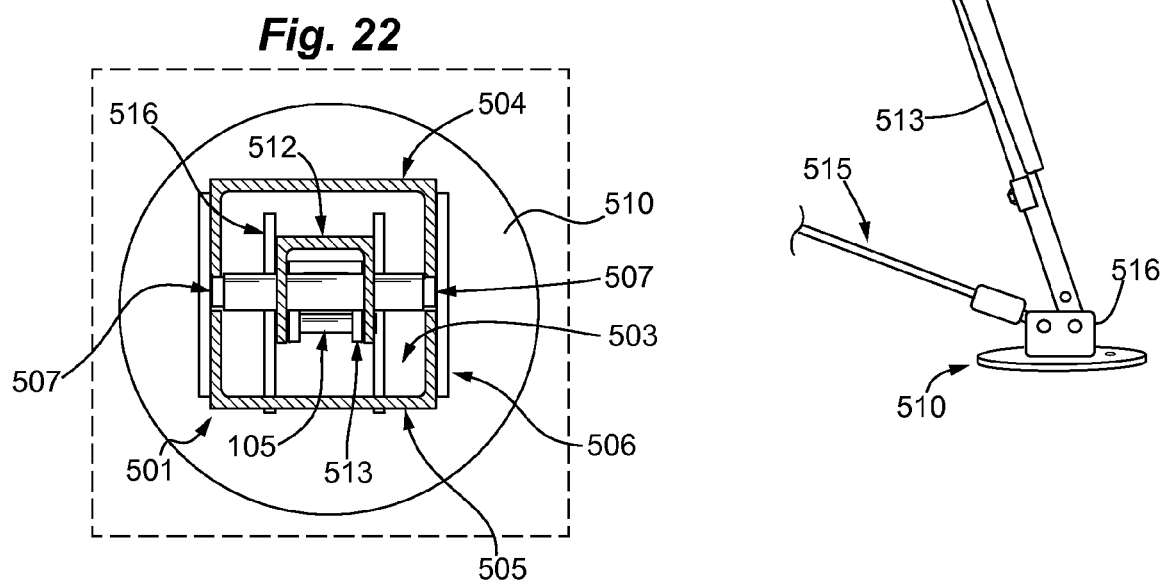

TRAVEL TRAILER STABILIZER SYSTEM

CROSS REFERENCE TO RELATED APPLICATIONS

This application is a continuation-in-part of U.S. patent application Ser. No. 13/898,456 filed 20 May 2013, now U.S. Pat. No. 8,840,144, which claims benefit of priority under 35 U.S.C. §119(e) from U.S. Provisional Patent No 61/650581 filed 23 May 2012, which is herein incorporated in full for all purposes.

GOVERNMENT SUPPORT

This invention was made without government support.

FIELD OF THE INVENTION

This invention is generally related to travel trailer supporting stabilizers, the invention providing a compound strut with overlever arm and above-axle mounting system for dampening trailer motions.

BACKGROUND

Travel trailers have gained widespread popularity. Americans frequently take their summer vacations on the road, and enjoy the comfort of living and sleeping in a trailer home when not driving with the trailer in tow. However, unlike a house mounted on a concrete slab or rigid foundation, persons in the trailer can experience a certain queasiness or disruptions in their activities and comfort because the trailer is constantly shaking A prior art stabilizer for use on a travel trailer is shown in FIG. 1, and consists of two extensible braces mounted in canisters that are integrated into the structure of the trailer at the front corners. The braces are operated to extend to the ground and lock when the trailer is stationary, and are retractable for moving the trailer.

This system is generally unsatisfactory in dampening trailer oscillations such as caused by the movement of a person in the trailer, and fails to address the role of tire flex, particularly sidewall tire flex, in allowing trailer oscillations. Generally the suspension and leaf springs will be stiffer than the tires, pointing to the tires as the primary source of the unwanted motion. Trailer body frames are not perfectly stiff, and various end braces are inadequate in suppressing swaying motions, side to side motions of the rear of the trailer (as in a fishtailing motion) or up and down motions (as in a front-to-rear bouncing motion or a centerbeam flexion motion) on the flexible sidewalls of the tires, which have not previously been recognized as being a primary source of unwanted trailer motion.

Other art of general relevance is found in U.S. Pat. Nos. 3,690,694, 3,801,128 and 3,933,372 to Herndon. The system taught by Herndon does not allow setting the leg length independently, which is a disadvantage when the trailer is on uneven ground, and attempts to stabilize only the rear of the trailer and not the frame of the trailer at the axle. Tension is applied by cinching together contralateral legs with a cross tie bar, but the cinching mechanism would require crawling under the trailer if adapted to the center axle. Thus the art fails to recognize a key aspect of the problem that needs to be addressed to be successful and cannot readily be adapted for a center axle. Similarly, U.S. Pat. No. 3,642,242 to Danekas, U.S. Pat. No. 3,558,092 to Hanson, and U.S. Pat. No. 7,338,052 to Hanscomb focus on the ends of the trailer, not the center axle, again, for more than fifty years, not recognizing the problem as one of stabilizing tire sidewall-related oscillations.

Because trailer oscillation is unpleasant, can interfere with eating or sleeping and distract from the comfort of living in a travel trailer or trailer-mounted mobile home, there is a long felt but unsolved need for a new and improved system to suppress them.

SUMMARY

Disclosed is an "at-park" travel trailer stabilizer system for a travel trailer frame with wheeled axle or axles, the stabilizing system comprising a right compound strut and a left compound strut, the struts for mounting one on each side of the frame at an axle or axles, each of the struts comprising: a) a base member having a footpad; b) an extension arm extending from the base member, the extension arm having a foot end and a head end, wherein the foot end is hingedly mounted on the base member and a transverse pivot axis is disposed proximate to the head end; c) an overlever arm pivotably mounted on the transverse pivot axis, the pivot axis defining a fulcrum that divides the overlever arm into a long arm segment comprising the bottom end and a short arm segment comprising the top end of the overlever arm such that the long arm segment and the short arm segment are dimensioned to achieve a mechanical advantage when pivoted on the fulcrum, the overlever arm having a cocked position in which the long arm segment is pivoted on the fulcrum at an acute angle above the extension arm and a locked position in which the long arm segment is pivoted on the fulcrum at essentially a zero angle relative to the extension arm, thereby lifting the frame fractionally from the tires; and, d) a mounting bracket member enabled to rigidly attach to a frame of a travel trailer under a wheel well; wherein the mounting bracket member is configured for engaging the top end of the overlever arm. The pair of struts is capable of being operated cooperatively to dampen tire and suspension-associated motions by setting said footpad on a foundation, engaging the top end of said overlever arm with the mounting bracket, and manually rotating said overlever arm from said cocked position to said locked position. The extension arm and the long arm segment and short arm segment of the overlever are dimensioned to enable bracing the frame between the pair of compound struts by applying a stiffening force with a mechanical advantage, thereby significantly reducing tire-associated motion.

In a preferred embodiment, the pair of compound struts and stabilizer system also comprises an anti-slip tension member, which is generally positioned between the footpads of the right and left compound struts or a pair of tension members positioned crisscross between the footpads and the mounting brackets. When placed between the footpads, the tension member forms the base of an approximate trapezoid in which the two struts hold the frame of the trailer level with the ground and the base angles are generally equal. When crisscrossing the trapezoid at diagonals between the top and bottom ends of the struts, the pair of tension members form the web of a rigid truss.

In another embodiment, the stabilizer system may comprise an adjustable length right compound rear strut and an adjustable length left compound rear strut, and may also comprise an adjustable length right compound forward strut and an adjustable length left compound forward strut.

Again, a tension member may be placed between the footpads of the right and left struts or advantageously two tension members may crisscross the trapezoid at diagonals between the top and bottom ends of the struts so as to form the web members of a rigid truss. These tension members ensure that the footpads do not slip when the overlever action is applied to lift the frame of the trailer fractionally from the tires.

In yet another preferred embodiment, the mounting bracket member is adapted to mount to a frame of a travel trailer between a tandem pair of axles, each axle having a set of leaf springs, such that the mounting bracket member engages the frame at a midpoint between the leaf springs. In this configuration, flexion of the tires, suspension and leaf springs are bypassed by the rigid strut as a supporting member, essentially lifting the frame fractionally from the tires and relaxing the suspension. Surprisingly, when 20-30% or more of the weight of a 5 ton trailer is relieved from the tires by this system, there is a substantial and welcome suppression of tire-associated oscillations at park.

Stabilizer systems having auxiliary compound struts or braces may also be provided. Auxiliary strut or bracing systems are placed at other axles or in proximity to the front and rear of the trailer so that the combination marginally improves the overall stiffening action of the system.

In another embodiment, the stabilizer systems have a stowage configuration and a deployment configuration, where the stowage configuration includes a modification such as a cradle built into or attached to the frame or suspension for receiving the struts and/or mounting brackets when not deployed, whereby the system need not be fully dismounted for storage when moving the trailer.

The foregoing and other objectives, features, and advantages of the invention will be more readily understood upon consideration of the following detailed description of the invention, taken in conjunction with the accompanying drawings, in which preferred embodiments of the invention are illustrated by way of example.

BRIEF DESCRIPTION OF THE DRAWINGS

The teachings of the present invention are more readily understood by considering the drawings, in which:

FIGS. 1A and 1B are perspective views of a travel trailer of the prior art.

FIGS. 5A and 5B are perspective views showing the action of an exemplary overlever compound strut of the invention and a mounting bracket.

FIG. 6 is schematic showing placement of a compound axle strut to dampen tire-associated oscillations.

FIGS. 7A and 7B are side and front elevation views of a compound axle strut with overlever arm.

FIG. 10A is an exploded view of an exemplary compound strut. FIG. 10B depicts a cross-section through an overlever arm.

FIGS. 12A and 12B are perspective views showing the action of an exemplary overlever compound strut with telescoping section for use at the rear of a trailer.

FIG. 21 is a side view of an under-frame cradle bracket having a central channel for stowing an overlever compound strut of the invention when not deployed.

FIG. 22 is a close-up view in cross-section as marked in FIG. 21. Shown are nested members of the overlever compound strut of the invention as stowed in the channel of the cradle bracket. In this example, the cradle bracket includes a rail or track and the struts include pins for slideably engaging the rail.

FIG. 23 is a side view of an under-frame cradle bracket having a central channel and outside end detent for engaging the overlever compound strut of the invention when deployed.

Figure 2:
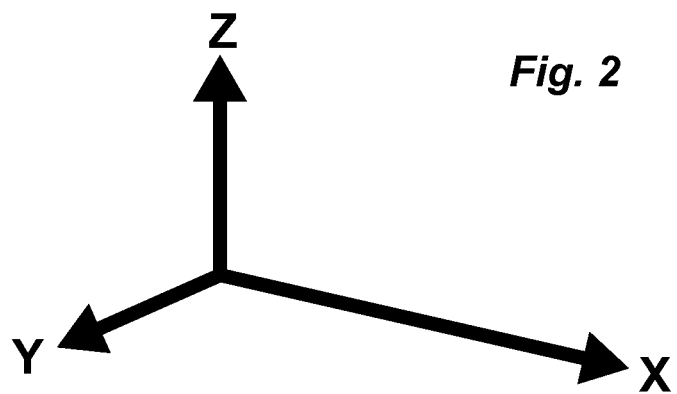
FIG. 2 is a view of the primary axes used in analyzing trailer oscillation.

The drawing figures are not necessarily to scale. Certain features or components herein may be shown in somewhat schematic form and some details of conventional elements may not be shown in the interest of clarity and conciseness. The drawing figures are hereby made part of the specification, written description and teachings disclosed herein.

Glossary

Travel trailer refers generally to "recreational vehicles," what are called "$5^{th}$ wheels", "motor homes" and campers, these include towable vehicles having one, two or three axles that are configured to mate with a trailer hitch to a motorized vehicle. Included are trailers mounted on bumper pull-type towing packages and trailers pulled on hitches that mount over the center of the axle of the towing vehicle, generally referring to as $5^{th}$ wheel-type trailers.

Referencing FIG. 2, where the X-axis is defined by the long axis of the frame of the recreational vehicle or trailer, the Y-axis is defined as following at least one axle thereof, and any Z-axis is defined by a line drawn from the sky to the ground through the frame, "yaw" refers to a rotation on a Z axis, the rotation taking place in the X-Y plane, as in a "fishtailing" motion.

"Roll" refers to a rotation on an X axis, the rotation taking place in the Y-Z plane, and can include a swaying or rocking from side to side.

"Pitch" refers to a rotation around a Y axis, the rotation taking place in the X-Z plane, and can include a rocking up and down at one or both ends, as in a teeter-totter motion or a bouncing motion of one end or the middle. While these terms are derived from seafaring or aviation, and are generally used for a vehicle underway, they may be applied to any displacement of a stationary vehicle. Displacement modes that are combinations of the above named X, Y and Z axis motions are also readily contemplated using this terminology, and all such motions may be typically quantified by measuring degrees of rotation on each of the three primary axes.

"Torsional stiffness" refers to a returning force associated with displacement in any direction, the returning force having a stiffness constant and an angular rotation on an axis. In its simplest engineering analysis, torsional stiffness can be approximated by a form of Hooke's law relating torque to deformation:

$$T = K^* \Delta\theta$$

where T is torque, K is a spring constant, and $\Delta\theta$ (theta) is the angular deformation or displacement in degrees, as measured relative to a resting or unstrained position.

"Dampening" refers to the dissipation of energy in motion of any type, especially oscillatory motion and the consequent reduction or decay of the motion. In an undampened system, any displacement associated with a torsional stiffness would result in an endless harmonic oscillation, however, all systems are dampened by frictional and hysteresis losses and when unperturbed will return to a resting state so that the oscillatory motion subsides over one or more cycles.

DETAILED DESCRIPTION

In a first embodiment, the invention is a travel trailer stabilizer system having a right and left compound strut for bracing the trailer at the midpoint of a tandem or double axle assembly, each compound strut having an overlever arm for applying a stiffening force to oppose or dampen any motion of the frame on the tires and suspension. The mechanical advantage of the compound struts is configured to transfer a part of the weight of the trailer from the tires to the struts and is generally capable of applying a stiffening force that fractionally lifts the frame off the tires and transfers weight to the rigid struts.

For comparison, a prior art stabilizer consisting of two extensible pod braces 1 mounted on the front corners of a trailer 2 is shown in FIGS. 1A and 1B. Each brace is provided with a footpad 3 to distribute the load on soft earth. However, this does not address motions associated with the tires 4, where the sidewall and tread are not rigid and contribute to oscillations of the trailer as described in FIGS. 2 and 3. These motions also cause significant lateral strains on the front braces 1.

Figure 3:
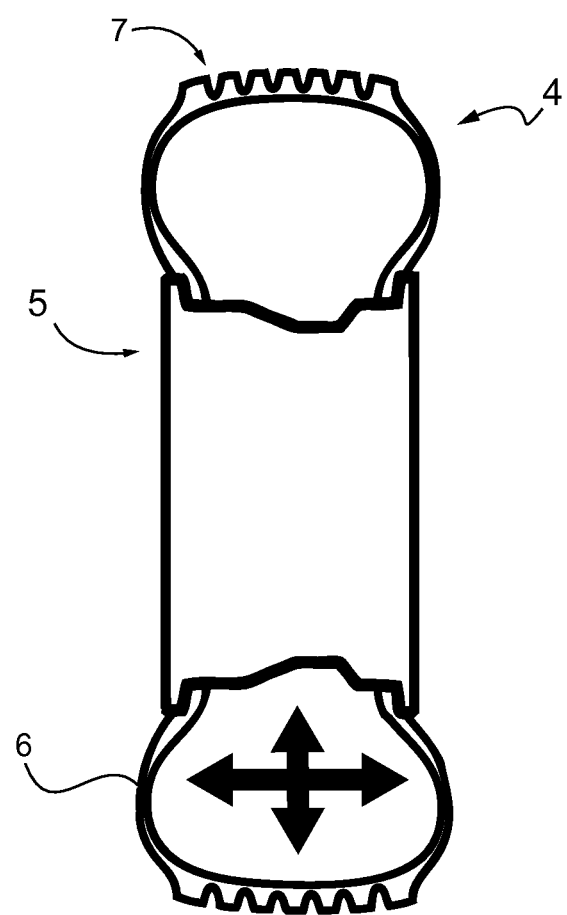
FIG. 3 is a schematic diagram of tire structure, depicting its contribution to trailer oscillation.

Referring to X, Y and Z axes (labelled in FIG. 2 as a frame of reference), FIG. 3 shows a cross-section through a tire 4 mounted on a hub 5 so that oscillations at the sidewalls are depicted. Forward and backward reciprocating motion in and out of the plane is also possible. As illustrated in FIG. 1, trailer end braces are not effective in suppressing lateral (Y), vertical (Z), rocking (YZ), or twisting (XY) oscillations (double-headed arrows) associated with flexion of the tire sidewalls 6, which behave as an elastic spring. A bending/arching motion at the middle of the trailer is also not suppressed. The tire tread 7 is generally immobilized on the ground, but oscillations around the contact zone are significant due to tire flexion in response to movement or shifts in weight inside the trailer and external forces such as wind.

Figure 4A:
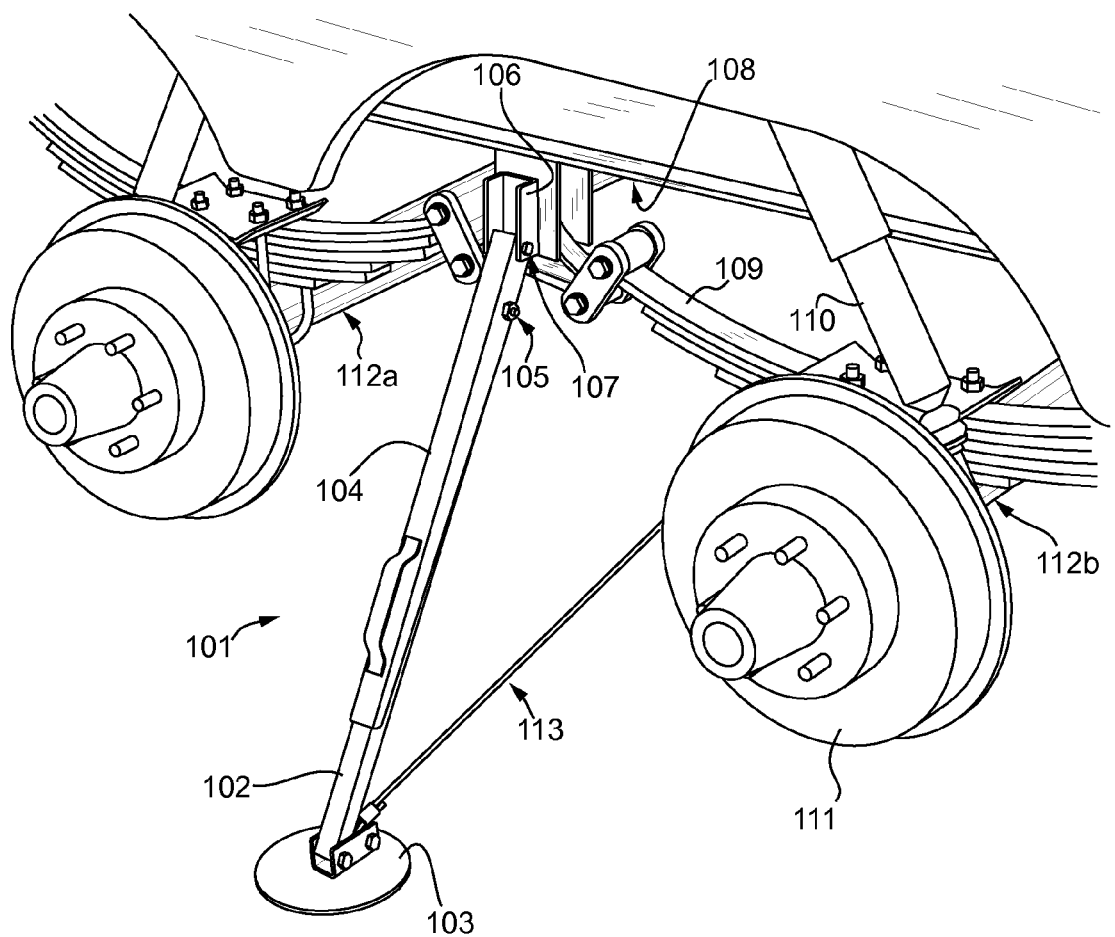
FIGS. 4A and 4B are front and rear views of an exemplary compound strut of the invention in place after removal of the tires of a double-axle trailer.
Figure 4B:
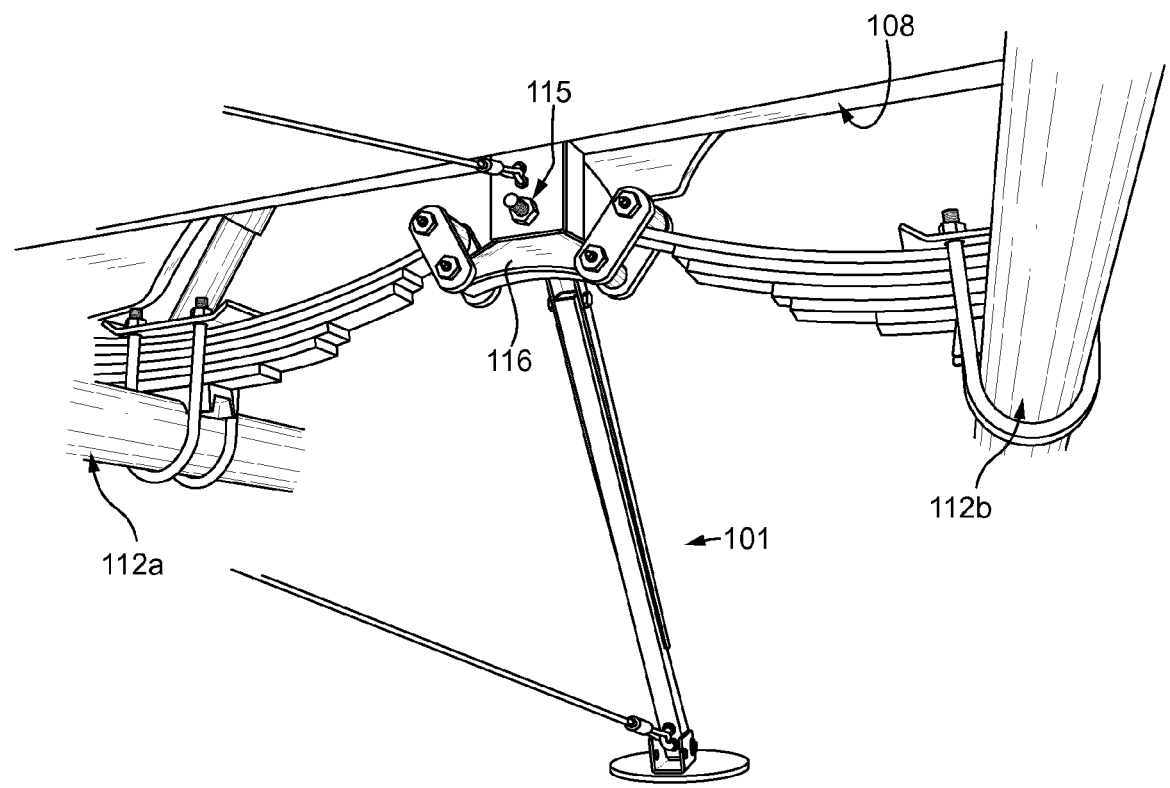

FIGS. 4A and 4B are front and rear views of an exemplary compound strut 101 of the invention as visible after removal of the tires of a double-axle trailer. The compound strut comprises an extension leg or arm 102 mounted on a footpad 103 and an overlever arm 104 attached to the extension arm 102 at a transverse pivot pin 105 which serves as a fulcrum to be discussed in more detail below. Also shown is a mounting bracket 106 (with support pin 107 for engaging the head of the overlever arm) rigidly attached to the trailer frame 108. The compound strut acts to lift weight from the tires and by-passes the leaf springs 109 and suspension members 110. Here the trailer is supported on strut 101. Tires and rims were removed to make the wheel hubs 111 and understructure visible. Also shown are two axles 112a and 112b. Cable member 113 joins an opposing strut on the opposite side of the trailer frame to prevent slippage of the footpad 103.

In FIG. 4B, compound strut 101 of the stabilizer system is shown as viewed from underneath the trailer. For clarity, the wheel members are not shown and the trailer frame 108 is supported entirely on the strut. The mounting bracket 106 is not visible in this view but is bolted at 115 to a rigid box that supports the suspension "equalizer" or rocker arm 116 and leaf spring assemblies for dual axles 112a and 112b. Cable ties are also shown.

FIGS. 5A and 5B are perspective views showing the action of an exemplary compound above-axle strut 101 of the invention with mounting bracket 106. In a first view, the "overlever arm" 104 is shown at an acute angle to the extension arm 102 on transverse pivot axis or fulcrum 105. In this example, a jaw 117 is disposed on the top end 114 of the overlever arm; the jaw is for engaging the mated support pin 107 in the mounting bracket 106. The mounting bracket is shown here in more detail. Bolts are provided to secure it to the trailer frame. The head of the overlever arm inserts into the channel formed in the mounting bracket to engage support pin 107 and cannot slip off unless the strut is flexed and loosened. Thus the engagement is readily reversible, but only by pulling up on handle 121 to relax and disengage the strut. FIG. 5A corresponds to a "cocked position" of the overlever arm on the compound strut, shown here with an acute angle between the two arms; FIG. 5B corresponds to a "locked position" of the overlever arm, in which the two arms have essentially a zero angle relative to each other at the pivot axis 105. In use, the dimensions of the lever arm may be selected so that to actuate the leverage, the overlever arm is first held horizontally and engaged with the mounting bracket 106 so that the footpad 103 is firmly against the ground. The overlever arm is then pushed down manually to line up with the extension arm; this actuates the lever effect at the fulcrum 105, raising the trailer frame fractionally off the tires and transferring trailer weight onto the rigid strut. The steps are reversed to disengage the strut. By using one strut on each side of the axle, the pair of struts, when locked in place, lifts some of the weight from both sides of the trailer off the wheels and forms a rigid Isosceles trapezoid having a rigid shape. The trapezoid may be further stiffened by placing a one or two tension members between the two struts, as will be described with respect to FIGS. 9 and 16.

As depicted in FIG. 6, in a related embodiment the invention is a compound strut 201 for insertion between the wheels (222a, 222b) of a tandem axle trailer, shown schematically, and engages a trailer frame 230 above the undercarriage. FIGS. 7A and 7B are side and front elevation views of a compound axle strut 201 with overlever arm, and show the structure of the compound strut in more detail. A footpad 203 resting on the ground is joined at a hinge 220 to an extension arm 202 that extends angularly into the wheel well of the trailer (not shown). A second arm 204 is attached by a transverse pivot pin 205 at the head of the extension arm 214, which is concealed inside a channel in the second arm of the compound strut. The transverse pivot pin 205 is a fulcrum for the overlever arm 204, which exerts a mechanical advantage as it is pivoted on the fulcrum against amounting bracket 205 affixed to the trailer frame 200. The mounting bracket includes a support pin or element 207, which engages a mating feature in the head of the overlever arm. Overlever arm 204 may include a handle 221.

The leverage exerted by the overlever arm lifts part of the weight from the tires and transfers it to the rigid strut. When used in pairs, one on each side of the trailer, the struts effectively stiffen the support for the frame over the axle, dampening or suppressing motion of the frame on the tires. The strut is essentially an above-axle support that bypasses the undercarriage, suspension and tires.

In use, the struts are inserted between the frame and the ground in a flexed position such that overlever arm is generally parallel to the foundation, and the overlever arm is then forced down to elevate the weight of the trailer frame off the wheels. A channel in the overlever arm permits the user to push the lever arm down so that it fits over the extension arm and the two arms are nested together.

The handle 221 is provided so that the overlever arm of the locked strut may be more readily disengaged from the extension arm 202 when releasing the load on the strut. Also shown is a locking bolt 223 for securing the overlever arm to the extension arm in the actuated position.

Figure 8A:
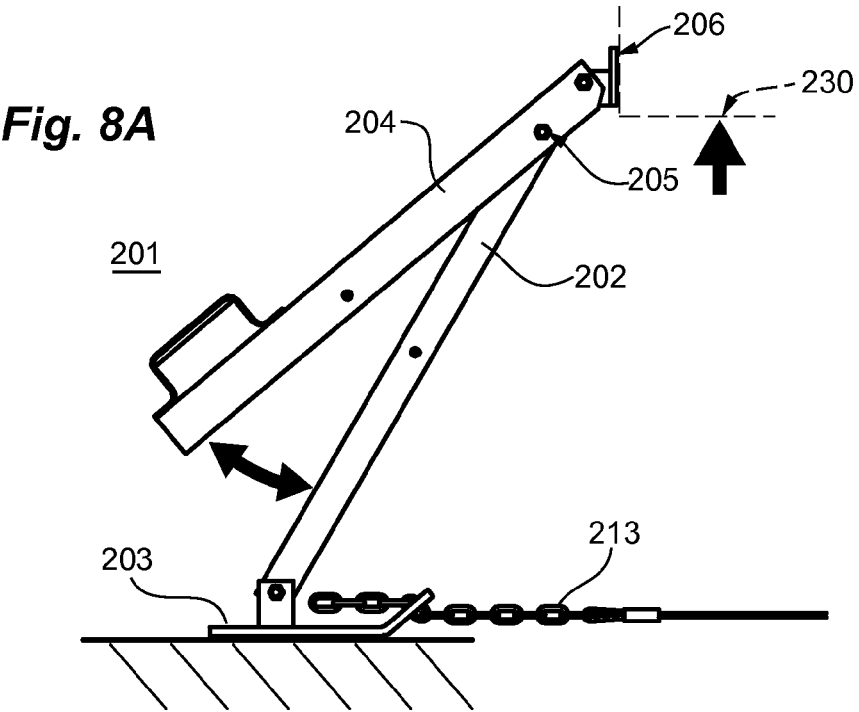
FIGS. 8A and 8B are action views showing a compound axle strut with overlever arm having a mechanical advantage.
Figure 8B:
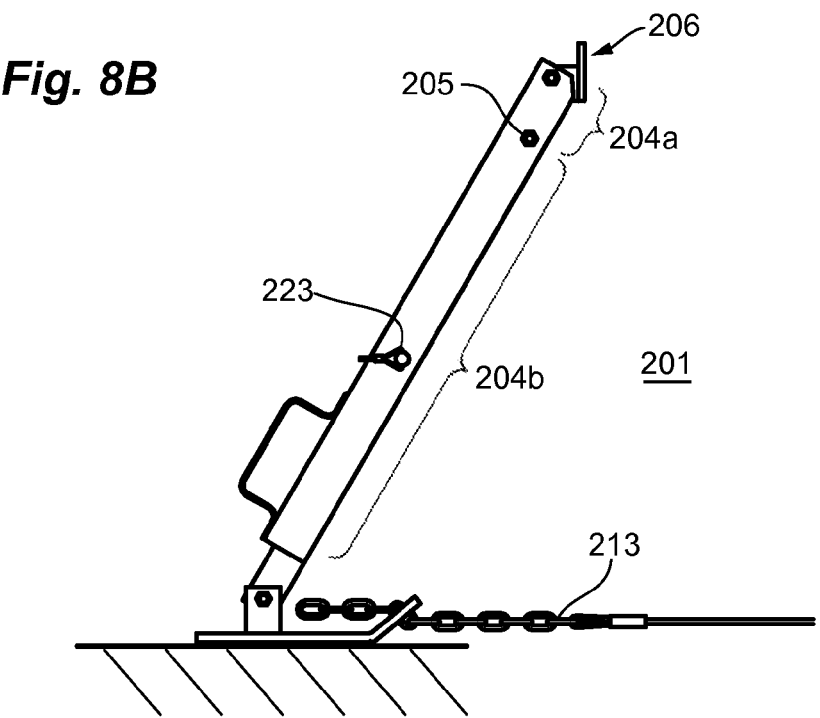

FIGS. 8A and 8B are action views showing the use of a compound axle strut 201 with overlever arm 204 to relieve tire-associated motion. The overlever arm is pivotably mounted on a transverse pivot axis 205, the pivot axis defining a fulcrum that divides the overlever arm into a long arm segment 204b having the first end and a short arm segment 204a having the second end of the overlever arm such that the long arm segment and the short arm segment are dimensioned to achieve a mechanical advantage when pivoted on the fulcrum. The overlever arm has a cocked position (illustrated in FIG. 8A) in which the long arm segment is pivoted up on the fulcrum at an acute angle above said extension arm to engage the mounting bracket 206 and a locked position (illustrated in FIG. 8B) in which the long arm segment is pivoted on said fulcrum at essentially a zero angle relative to the extension arm. As shown, counterclockwise rotation of the overlever arm from the cocked position results in a mechanical advantage exerted on the load (trailer frame represented as dashed line 230) attached to the mounting bracket, literally lifting the trailer. A clockwise rotation relaxes and disengages the strut. "Mechanical advantage" (MA) is a measure of the force amplification achieved by using a lever and is the ratio of the length of the segments of the lever arm on either side of the fulcrum, as in, $$MA = \frac{F_L}{F_S} = \frac{L_1}{L_2}$$

where $L_1$ is the length of the long arm segment and $L_2$ is the length of the short arm segment, $F_L$ is the force applied below the fulcrum, and $F_S$ is the resultant force above the fulcrum, which is applied to the load.

In this embodiment, the mechanical advantage is a factor of about 8.4. The overlever arm is divided by the fulcrum pin into a long arm segment of about 23 inches and a short arm segment of about 2¾ inches, while not limited thereto. In other embodiments, the mechanical advantage is generally greater than about 5 and less than about 20. If desired, extending the long arm segment may be used to increase the mechanical advantage.

With respect to the embodiment of FIG. 5, the mechanical advantage was a factor of 6.8 with respect to fulcrum axis 105. The short arm segment was 2.5 inches and the long arm segment was 17 inches. Nonetheless, both systems functioned well in stabilizing trailer oscillations around center axle. Based on our experimentation, a preferred mechanical advantage with the lever arm at horizontal is in the range of about 5 to about 20, more preferably about 5 to about 10.

Actuation from the cocked to the locked position is depicted by comparing FIGS. 5A and 5B, and FIGS. 8A and 8B, where it can be seen that as the lever arm is rotated counterclockwise on a transverse pivot pin or axis, the mounting bracket is driven upward until the two arms of the compound strut are nested together. The rigid strut bears a part of the gross vehicular weight and is a rigid compression bearing member, unlike the tires, which are deformable bags supported by compressed air. A locking bolt may be used so that the strut is held rigidly in its actuated position and a tension member 213 may be used to prevent lateral slippage of the footpads.

Figure 9:
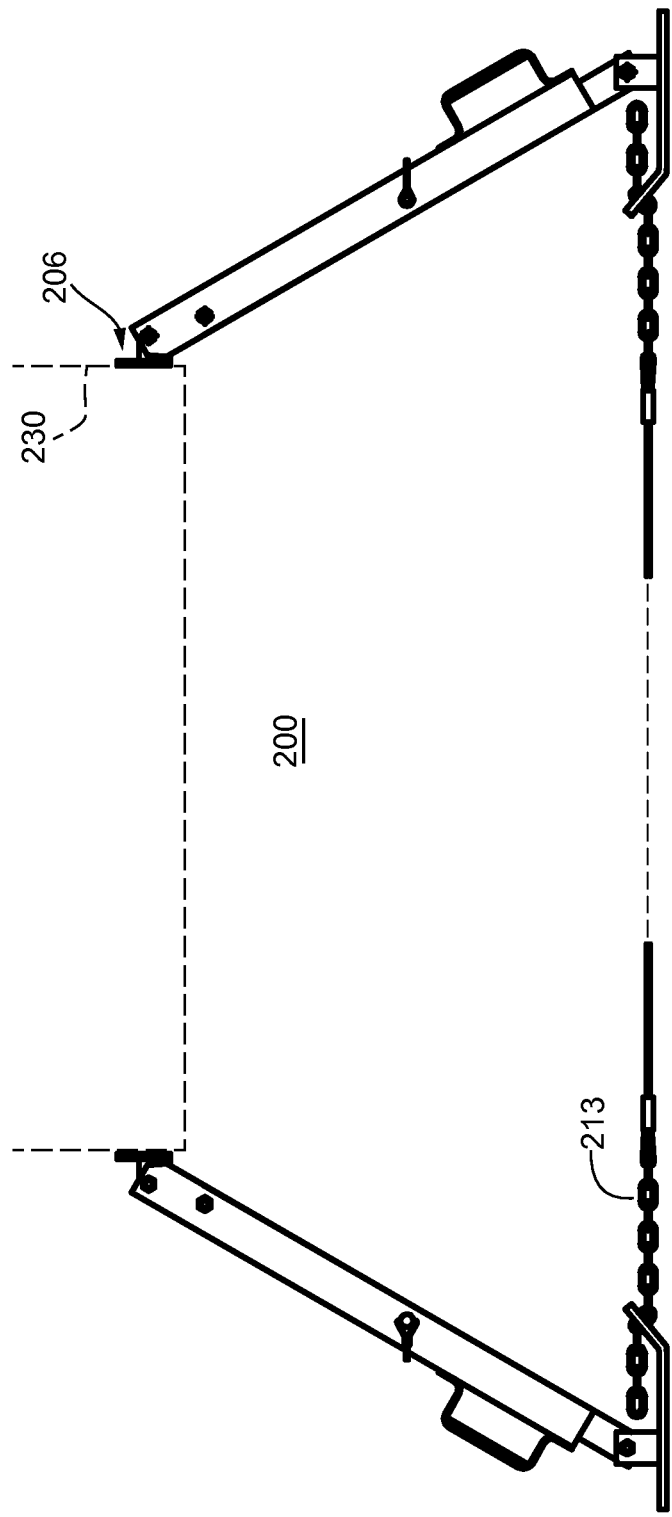
FIG. 9 shows two opposing axle struts as are placed on each side of a trailer and a tension member between the bases of the struts.

FIG. 9 shows placement of two opposing axle struts as are placed one on each side of a trailer body (dashed tray 230) so as to form an embodiment of a complete above-axle stabilizing system 200, where "above-axle" indicates that the tires and undercarriage are bypassed by the strut. As shown in FIG. 9, the two struts are capable of being operated cooperatively as a pair to contralaterally dampen tire motions. Each member of the pair is operated by setting the footpad on a foundation, engaging the top end of the overlever arm with a mounting bracket 206, and manually rotating the overlever arm on the fulcrum from the cocked position to the locked position shown here. The trailer is lifted fractionally from the tires by this process.

As fully installed, the axle struts and trailer frame span have the geometry of an Isosceles trapezoid. In this view, a tension member 213 is placed between the footpads of the right and left axle struts, completing the trapezoid. The tension member is shown here as a cable having sections of chain affixed at both ends so that the length may be adjusted by inserting individual chain links into a mating slot on each footpad during setup. The tension member may be marked by the owner for use as a measuring tool during setup so that the strut angles are generally correct for stabilization and do not change after the stabilizer system is locked in place. By mounting one strut in place and then using the cable to position the base of the second strut, when the overlever action is applied contralaterally to both struts, the final assembly will be prestressed so as to resist trailer motions. The tension member may also be a cable or strap with ratcheting means for drawing up the slack, but we find that a chain link attached at each end suffices as an inexpensive and effective way to achieve the needed stabilization. Crisscrossed pairs of tension members are also useful in embodiments of the invention, as would be analogous to the tension web shown in FIG. 16.

FIG. 10A is an exploded view of an axle strut 201. In this embodiment, it will be understood that the parts of the strut may be bolted together. Wingnuts may be used for ease in adjustment or stowage. The compound strut consists of two arms, the extension arm 202 and the overlever arm 204 joined at transverse pivot axis 205. Extension leg 202 is joined to supporting footpad 203 by a hinge 220, shown here as would be formed of channel stock and bolted to the footpad. In other embodiments, functionally equivalent struts, arms, footpads and mounting brackets may be formed by alternate methods of construction such as welding or machining FIG. 10B depicts a cross-section through the overlever arm 204 with internal channel 204c. Advantageously, in the locked position the greater part of the extension arm is nested in the long arm of the lever arm when locked. The lever arm may be formed of a piece of U-shaped channel stock, for example, where the inside dimensions of the channel are selected to accommodate the outside dimensions of the extension arm. The same channel stock may be used to form the hinge joint if desired.

Figure 11:
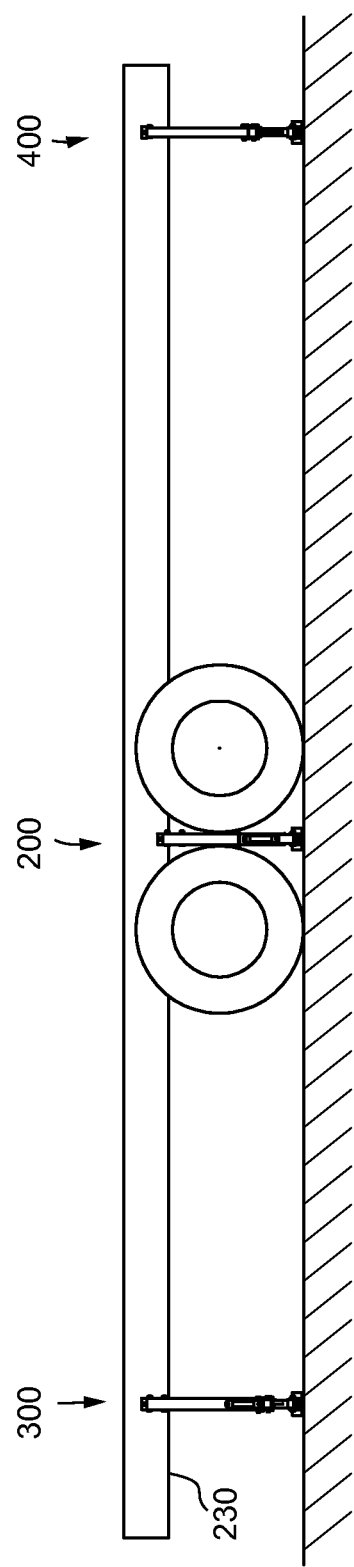
FIG. 11 is a schematic view showing placement of a central axle strut and front and rear auxiliary braces.

FIG. 11 is a schematic view showing placement of an above-axle strut system 200 and rear strut system 300 and front 400 auxiliary braces on a double axle trailer bed or frame 230. It will be readily apparent that a smaller trailer stabilized with an above-axle strut system and an auxiliary rear brace will be satisfactorily dampened in both vertical and lateral motions for most purposes, but a front bracing system may be added if desired to further suppress oscillations of a larger trailer, for example. Oscillations need not be large displacement oscillations to be annoying and rattle the china; thus combination systems have two or three sets of bracing members are requested by some customers.

FIGS. 12A and 12B are perspective views showing the action of an exemplary overlever compound strut with telescoping section 310 for use at the rear of a trailer. In a first view, the overlever arm 304 is shown at an acute angle to the extension arm 302 on transverse pivot axis or fulcrum 305. A jaw 317 is formed on the top end 314 of the overlever arm; the jaw is for engaging mounting hardware on the trailer frame (not shown). The jaw 317 at the head of the overlever arm engages mounting hardware attached to the frame when in use. Engagement is readily reversible, but only by pulling up on handle 321 to relax and disengage the strut.

Figure 13A:
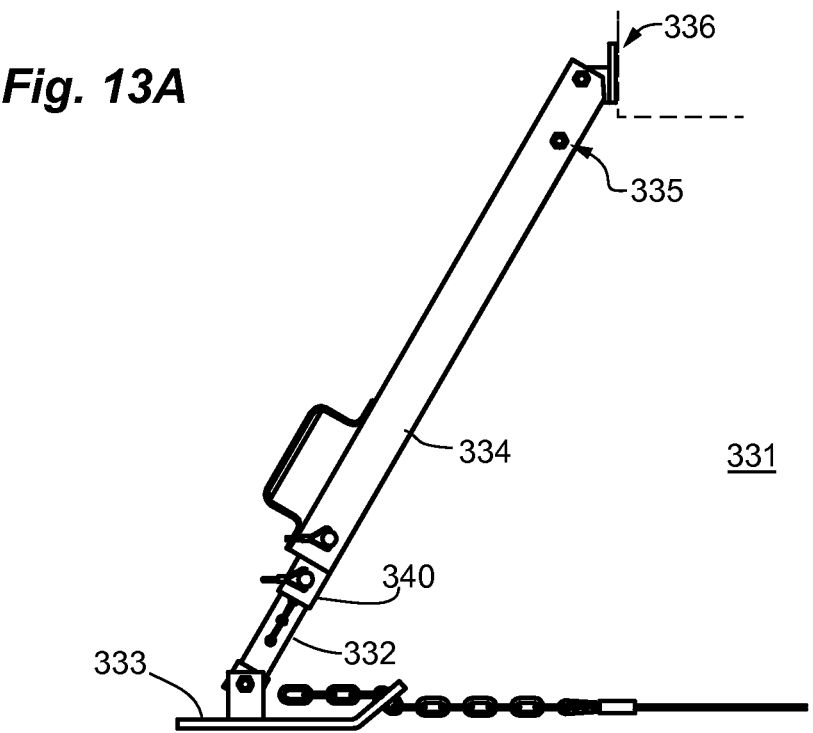
FIGS. 13A and 13B illustrate an alternate embodiment of a rear compound strut.
Figure 13B:
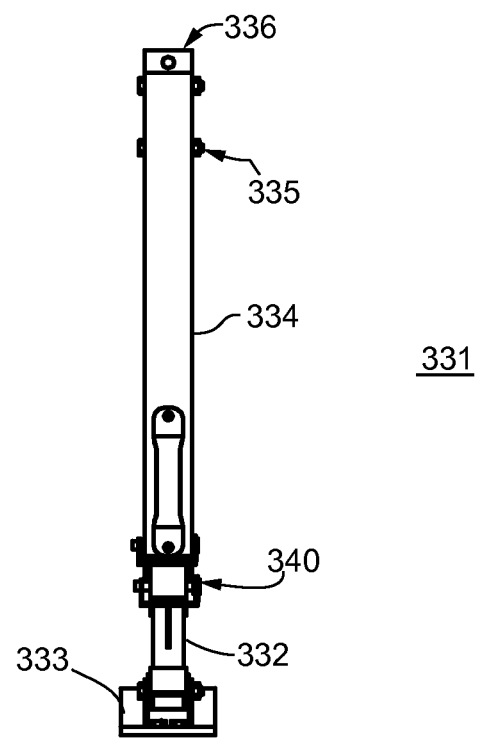

FIGS. 13A and 13B illustrate another embodiment of a rear compound strut 331, which includes an adjustable segment 340 that telescopes from an extension arm 332 as required. The extension arm is hingedly mounted on a footpad 333. A lever arm 334 mounts at a fulcrum 335 on the head of the extension arm. This compound strut with lever arm is used to exert a force on a trailer so as to reduce pitch and yaw at the rear of the frame where unsupported displacement is expected. Torsional perturbation around the Z-axis or the Y-axis is resisted by mounting a compound strut at the ends of the frame where the distance from the axis of rotation is greatest. As shown, a mounting bracket 336 is affixed to the trailer frame (dashed lines). The bracket useful for engaging mated hardware on the head of the overlever arm. A center axle strut system 200 is most effective in reducing roll throughout the frame, but a rear strut system 300 may perform cooperatively in reducing end motions. The strut systems 200 and 300 each include a pair of compound struts for contralateral placement on the trailer body frame.

The rear strut or brace is generally put in position after the above-axle struts are locked down, and may require additional adjustment to ensure the correct length. In the embodiment shown, the length adjustment is achieved with a telescoping segment 340 that can be lengthened as needed and is provided with a locking member once adjustment is completed. Although it has been found to be useful to include an overlever arm in the rear strut pair, simple telescoping braces may also suffice for some applications.

As fully installed, trailer frame and rear strut assembly, using a pair of rear struts, may have the geometry of an Isosceles trapezoid. A tension member between the two footpads may be used so that the bases of the rear braces are positioned properly with respect to angle at which the brace is set with respect to the trailer frame. By positioning the tension member before levering up the trailer frame, the stabilizing system can be prestressed to take any loose motion out of the rear of the trailer.

Figure 14:
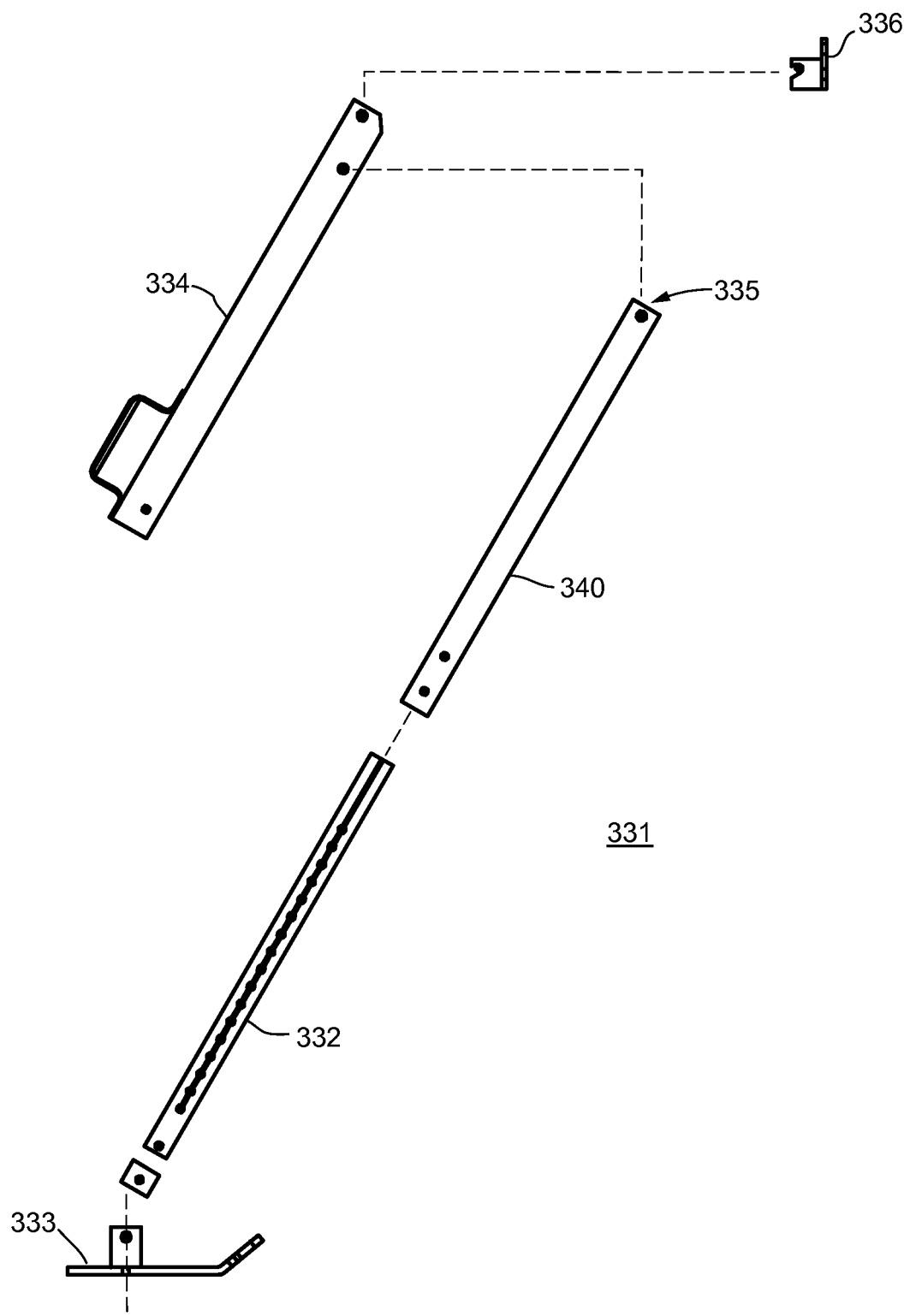
FIG. 14 is an exploded view of a rear compound strut with telescoping arm.

FIG. 14 is an exploded view of a rear brace. As can be seen, the compound brace 331 comprises a lever arm 334 affixed at a pivot axis 335 at the head of the extension arm, but the extension arm is made up of a tubular sleeve 340 and a telescoping insert 332 that can be preset to a shorter or longer length by use of a rack and pin assembly as shown or other locking means. A hinged connection between the extension arm and the footpad 333 is provided.

Figure 15A:
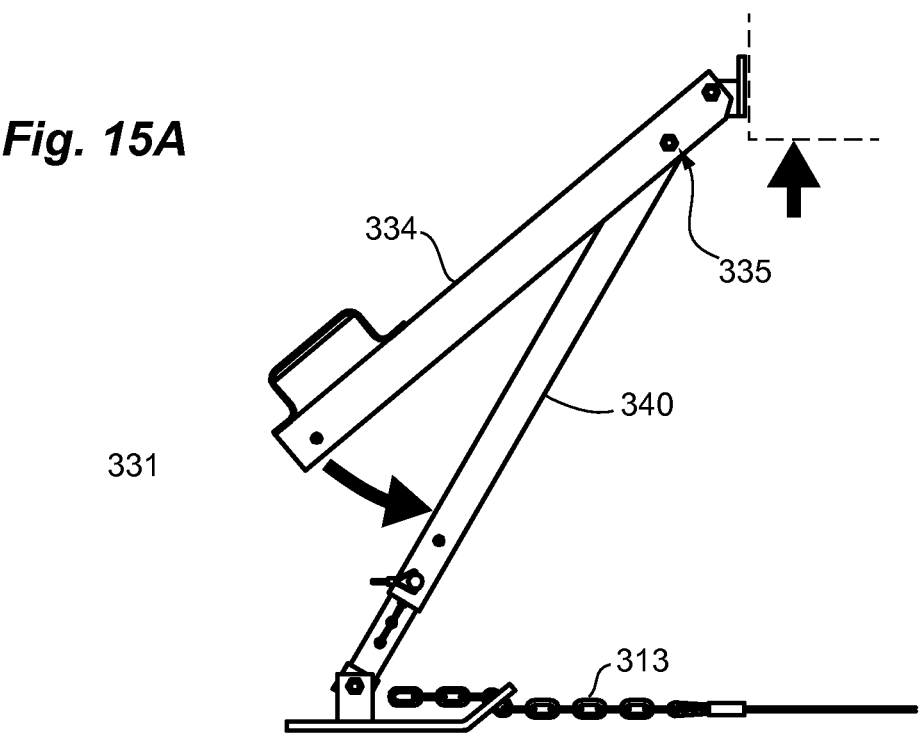
FIGS. 15A and 15B are action views showing the use of a rear strut with overlever arm having a mechanical advantage.
Figure 15B:
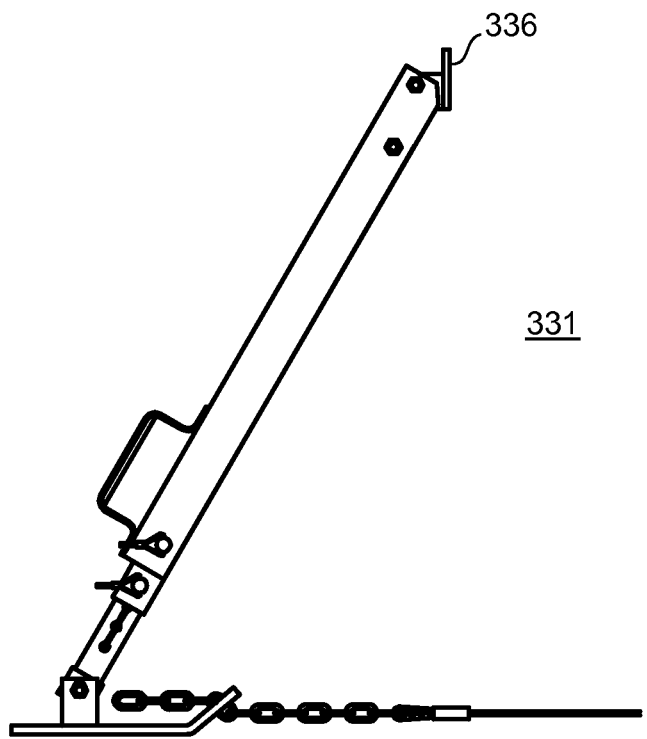

FIGS. 15A and 15B are action views showing the use of a compound strut system with overlever arm 334 and telescoping section 340 to relieve rear trailer motion. Once the required length of the rear brace is adjusted, the strut is engaged at the mounting bracket 336.

As the lever arm is rotated counterclockwise on the pivot pin, the mounting bracket with trailer body (dashed lines, arrow) moves upward until the two lever arms are nested together (a channel is provided in the overlever arm to receive the extension arm) so that the strut bears a part of the load. A locking bolt may be used so that the strut is held rigidly in its actuated position.

The mechanical advantage of the lever system is determined by the length of the overlever arm on either side of the fulcrum pin 335. However, because the two footpads will tend to slip out as leverage is applied, a tension member 313 may usefully be positioned before leverage is applied. By mounting one brace in place and then using the cable or cables to position the second brace, when leverage is applied to both braces the final assembly will be prestressed so as to resist trailer motions.

Figure 16:
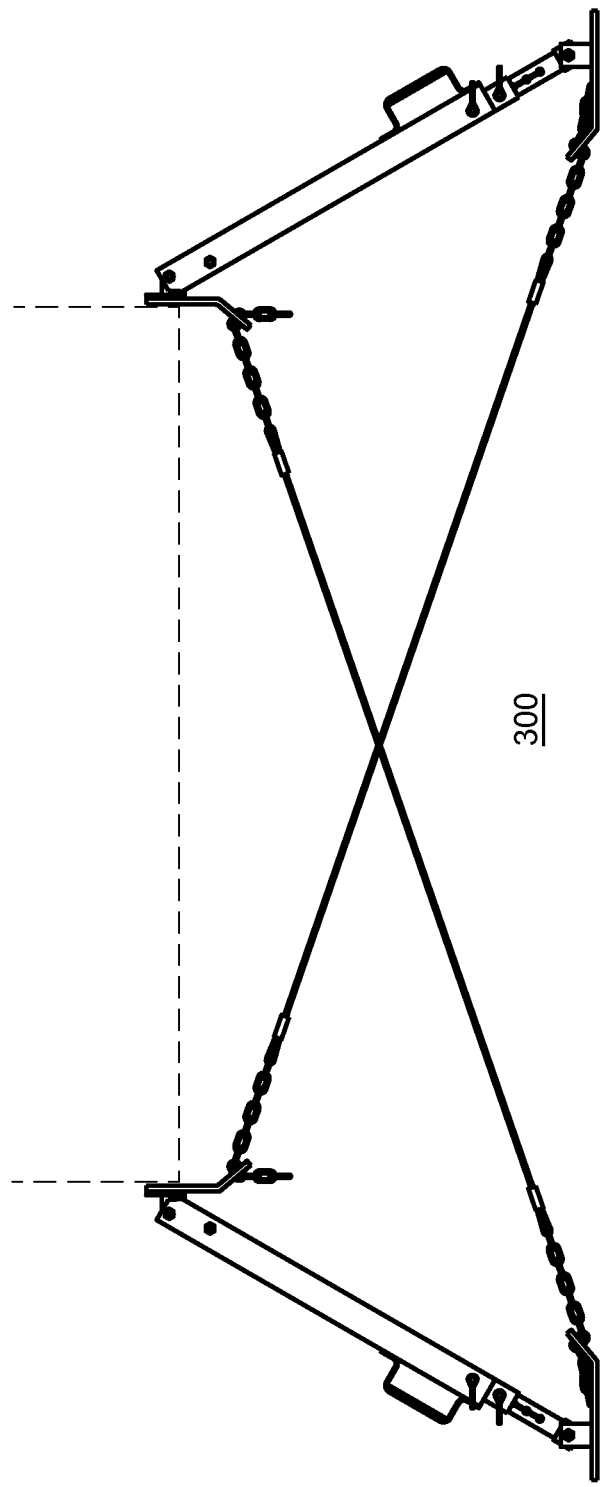
FIG. 16 shows placement of two opposing rear struts as are placed on either side of a trailer and a pair of crisscrossing tension members placed diagonally between the legs.

Alternatively, two tension members are used. By placing a pair of tension members so as to crisscross the trapezoid at diagonals between the top and bottom ends of the struts, the tension members become web elements of a rigid truss. The triangles of the truss are dimensionally stable, and ensure that the rear of the trailer body (dashed line) is effectively immobilized without the need for a pouring a concrete foundation or installing hydraulics. FIG. 16 shows placement of two opposing rear struts with crisscrossed tension members. Together the struts form a complete rear stabilizer assembly or system 300. Struts are placed on either side of a trailer and actuated. The use of a pair of crisscrossing tension members placed diagonally between the struts is useful to further stabilize the system in the form of an Isosceles trapezoid with internal web tensioners.

Figure 17A:
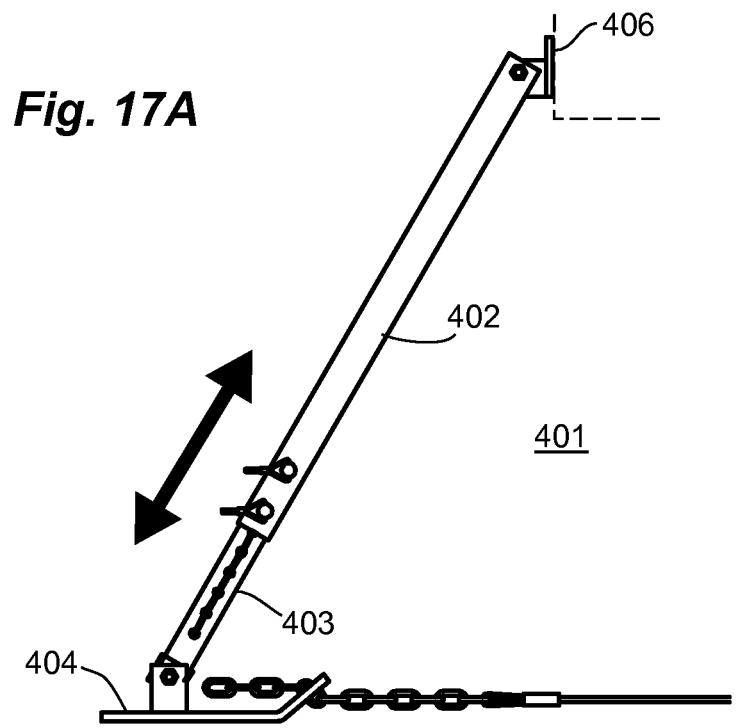
FIGS. 17A and 17B illustrate a structure of a front compound brace.
Figure 17B:
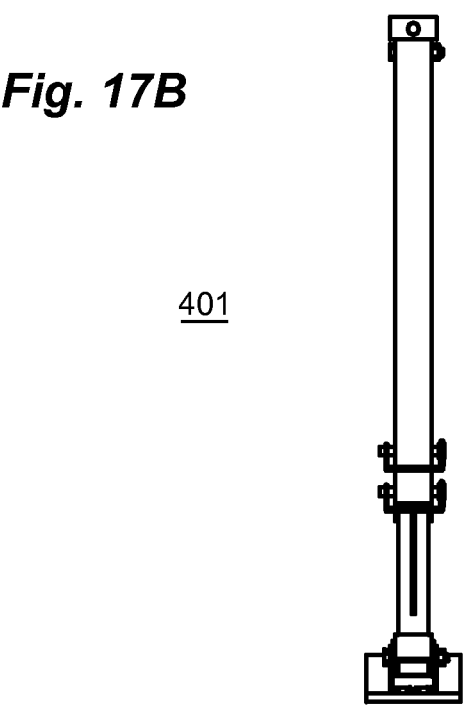

FIGS. 17A and 17B illustrate a structure of a front brace 401 in side and frontal views. In a preferred embodiment, the front brace is simply a telescoping strut having a generally tubular section 402 sliding on an internal leg or rail 403 and which can be inserted in place at the front of the trailer and the length locked. Leg 403 is hingedly attached to a footpad 404. The head of the brace engages mated hardware 406 that is affixed to the trailer body or frame (dashed line). An additional stabilizing force may be applied if a tension chain, cable or strap is used.

Figure 18:
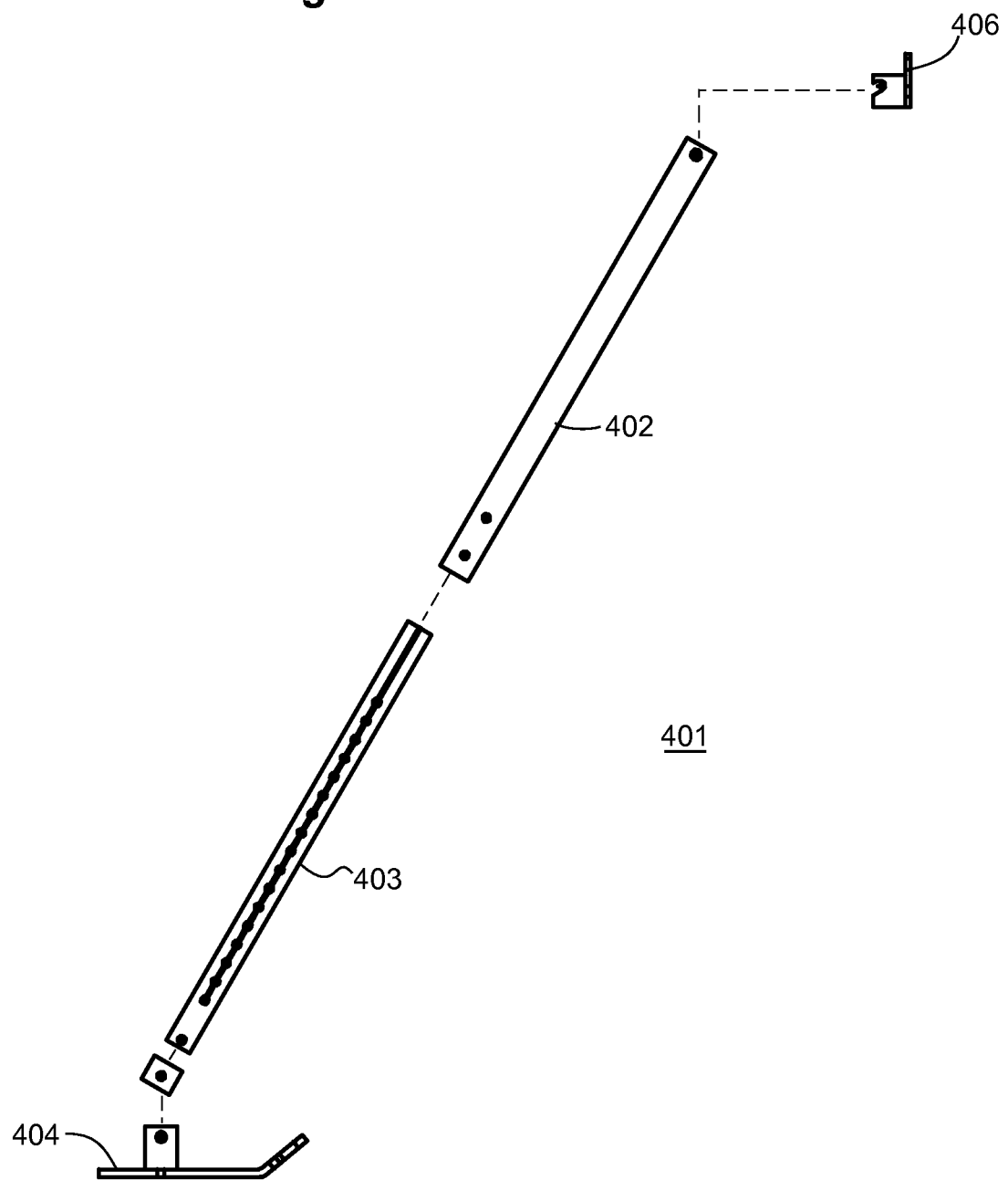
FIG. 18 is an exploded view of a front compound brace with telescoping section.

FIG. 18 is an exploded view of a first embodiment of a front brace 401. The brace includes an extensible length 403 hingedly mounted on a footpad 404. Generally the brace is positioned as an auxiliary stabilizer and requires that the length be adjusted before the brace is set in place. A tubular telescoping segment 402 is used for this purpose.

Figure 19:
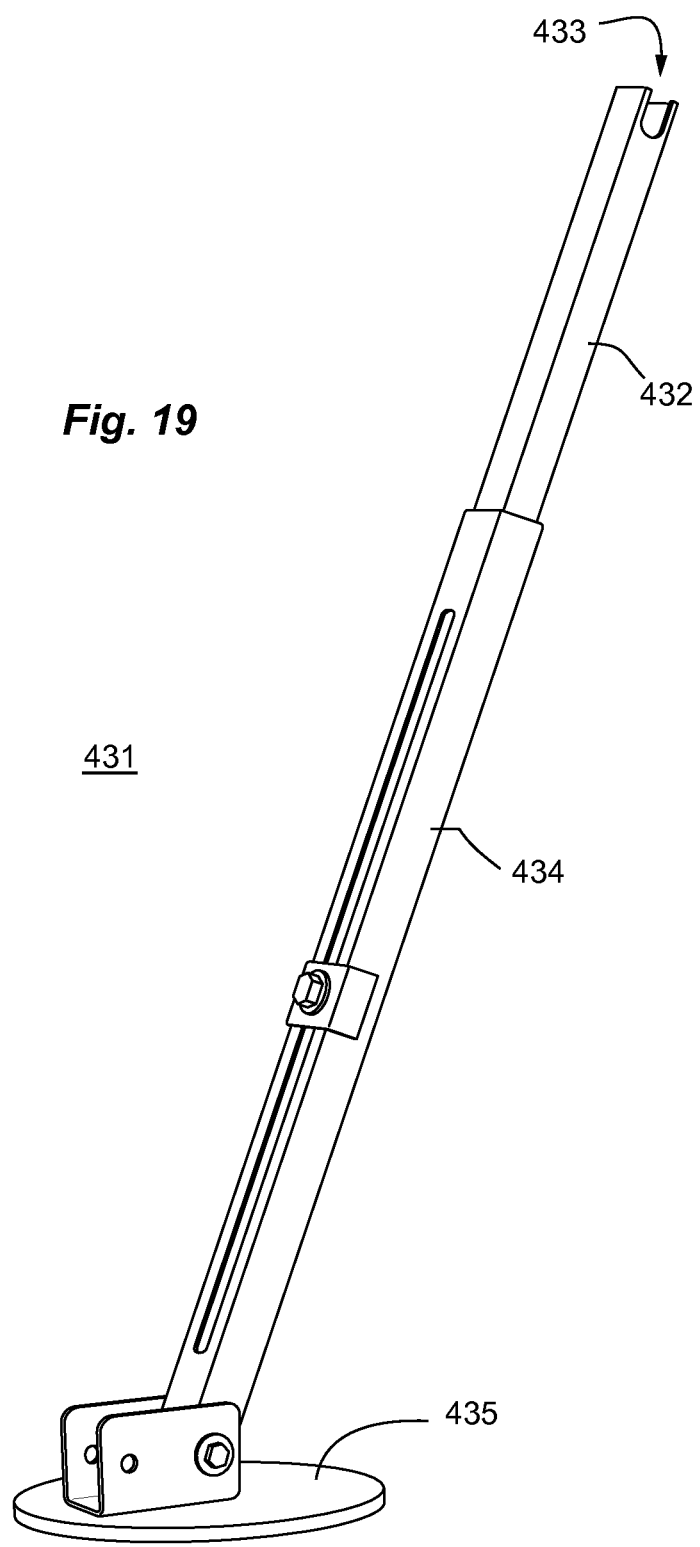
FIG. 19 is a perspective view of a front compound brace.
Figure 20:
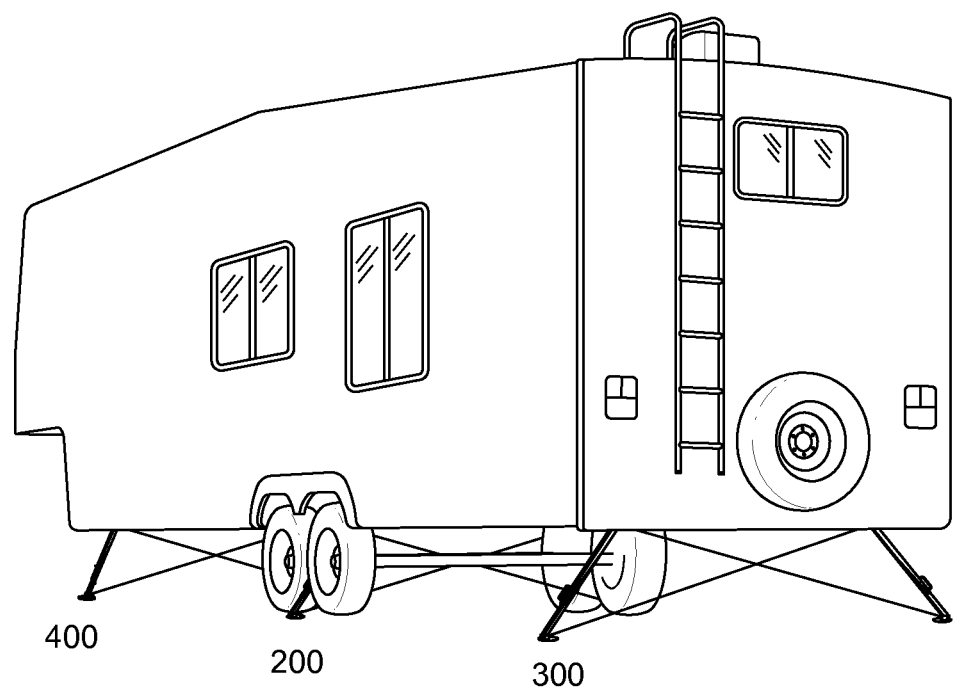
FIG. 20 is a perspective view of a travel trailer with center axle compound strut stabilizer system and auxiliary stabilizers deployed at the front and rear of the trailer.

FIG. 19 is a perspective view of an alternate front compound brace. The structure includes a telescoping arm 431 with jaw end 433 for engaging a mated fitting on the trailer frame near the front of the trailer. The telescoping arm slides in a tubular segment 434 which is hingedly mounted on a footpad 435. Generally two such braces are used, one on either side of the trailer body, and act cooperatively with an above-axle strut 200 to reduce anteriolateral swaying and rocking. As shown in FIG. 20, front braces may also be used with center and rear strut assemblies to reduce trailer oscillations. FIG. 20 is a perspective view of a travel trailer with center axle compound strut stabilizer system 200 and auxiliary stabilizer systems deployed at the front 400 and rear 300 of the trailer. Crisscross tension members are used to prevent the footpads from slipping in soft earth.

In another aspect, the invention also is a method for stabilizing an at-park travel trailer, which comprises providing a trailer stabilizer system having a pair of above-axle struts 200; and for each compound strut of the pair, i) setting the footpad on a foundation; ii) engaging the second end of the overlever arm with the mounting bracket; iii) manually rotating the overlever arm from the cocked position to the locked position; and, such that the pair of compound struts are installed contralaterally on the frame of the trailer at an axle or axles. The rotation of the overlever arm is meant to be done with one hand and one hand only. There should be some resistance but not so much that full body weight is needed to actuate the lever. If excessive resistance is encountered, reset the footpad position and try again. When strut leverage is applied, the trailer body is fractionally raised off the tires, minimizing tire motion and spring flexion as a factor in undesirable oscillations of the trailer at park. The method may also include a step for setting one or two tension members between the struts before rotating the overlever arm to the locked position. In a preferred method, the tension members are cables, are set in a crisscross pattern, and are used to measure out the position of the feet of the struts for optimal performance before the overlever arms are actuated to the locked position. Cables having adjustable lengths may be used, but advantageously, cables having a determinate length may be used to lay out the stabilizer system during setup. A preferred strut angle relative to perpendicular is about 30 to about 38 degrees, and by preforming the cables to a defined length, a consistent angulation of the struts is more readily achieved.

There is a preferred order for placement of the supporting structures. In general, the center axle strut pair is placed on the trailer first and then tensioned. The rear braces are placed second, and are first lengthened as required to securely fit in place before being levered against the trailer frame. This ensures that the placement of the center axle strut does not loosen the rear end stabilizer. A third stabilizer may then be positioned at the front of the trailer. Although a center axle stabilizer and a rear axle stabilizer have been found to be effective in relieving most trailer motion, the additional stability achieved with a front brace may be desirable for some users having longer trailers, for example.

Stowage systems may be used for storing the stabilizer struts during travel. These stowage systems are mounted on the underside of the frame and typically include hardware used to engage the jack head 314 of the struts or braces (referring to FIG. 12 for example). The strut is only partially disassembled for travel, and need only pulled out to be deployed for setup. In a preferred embodiment, a support pin for engaging jaw 317 may be part of the mechanical assembly of the stowage system and may also be used as a locking bolt to secure the strut during transit. Precut cables may be used to "lay out" the strut footpads at a preferred working angle of about 30 to 40 degrees from perpendicular, easing the effort to set up and actuate the stabilizing system when the trailer is at park.

FIG. 21 is a side view showing an under-frame cradle bracket 501 having a central channel for stowing a strut 502 of the invention when not deployed. The central channel is shown in FIGS. 22 (see 503) and is formed by a top 504 and bottom 505 channel iron piece tacked together with side tabs 506. The channel members are gapped to form an open rail or track 503a on the walls of the central channel, the track for slideably receiving a jack pin 507 that extends between the rails formed on each side of the cradle, and is stepped to stay in the track when in the stowage position 500a. The arms of the strut are nested in the locked position before being inserted into a channel in the cradle. The footpad 510 of the strut is provided with an attachable fastening system (shown here as a threaded fitting 509 in FIG. 21) so as to be secured to the cradle or frame during transport in the stowage position. Vibration-resistant and redundant attachment systems that provide an equivalent attaching function are also conceived.

In FIG. 23, the strut is shown in the deployed position 500b and the jack pin 507 engages a detent, shown here as a jack notch 508 in the underside rail of the upper channel member 504. The action of the overlever arm 512 of the strut on the extension arm 513 is thus transmitted to the cradle which in turn is affixed to the frame so as to stabilize the entire structure and oppose any oscillating motions. The fulcrum 105 is a pin that joins the overlever arm and extension arm and works as described previously with reference to FIGS. 5A and 5B but with a substitution of the jack pin 507 for the bracket assembly 106. A transverse cable 515 or chain may be used for additional stabilization as described in earlier examples, and is stowed separately. Generally the cable attaches to a hinge-plate adaptor 516 on the foot.

Figure 24:
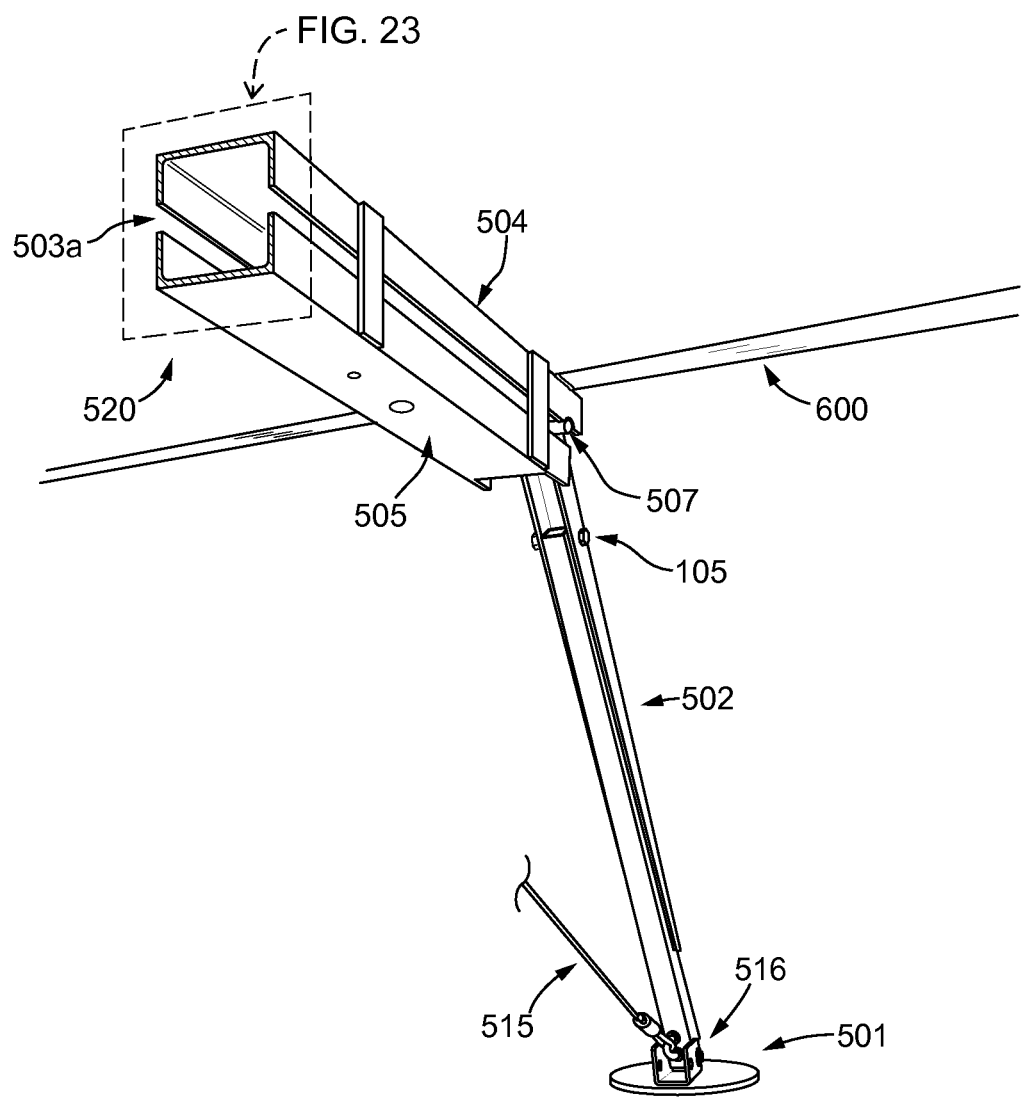
FIG. 24 is a first perspective view of a cradle bracket integrated into the frame of the trailer. An overlever strut is shown in the deployed position engaging a detent or jack point at the outside end of the cradle bracket. The view is a partial view of a cradle beam that spans the frame from side to side.
Figure 25:
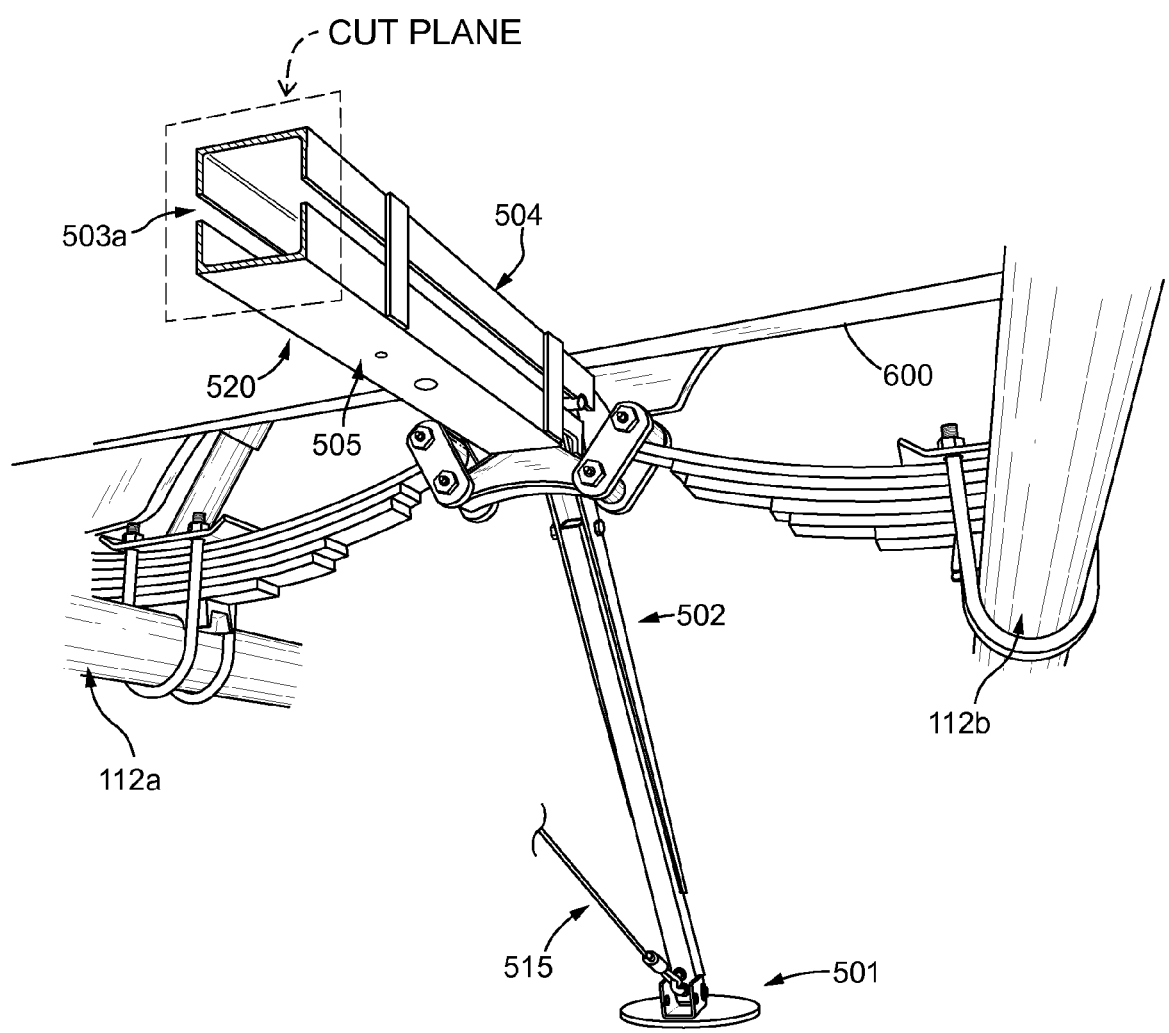
FIG. 25 is an alternate perspective view of a cradle bracket integrated into the frame of the trailer. An overlever strut is shown in the deployed position engaging a detent or jack point at the outside end of the cradle bracket. The view is a partial view of a cradle beam that spans the frame from side to side and is configured to engage the frame and support a center leaf suspension for a tandem axles. Wheel rims and tires are not shown for clarity of the view.

With reference to the cross-section marked on FIG. 23, the views of FIGS. 24 and 25 show the cross-section in planar form and the remaining structure in perspective as viewed from under the frame. A first cross-sectional view is shown in FIG. 22 as marked on FIG. 21. FIG. 22 shows the cradle 501 in section with top member 504 and bottom channel member 505 forming a central channel 503 for receiving the strut. The hingeplate 516 and footpad 510 are shown as would be seen at the far end of the channel, where they are not confined by the inside dimensions of the cradle. Shown are nested arm members (512, 513) of the overlever compound strut of the invention as stowed in the inside channel of the cradle bracket. The jack pin 507 (with right and left ends seated in the channel track) are slideably received in the cradle, which may be welded to the frame or otherwise affixed. FIG. 23 (double headed arrow) shows the action of reversibly stowing and deploying the strut by moving it from a stowage position 500b within the cradle to a deployed position where the footpad is supported on a foundational surface and leverage is exerted by the lever action as described earlier.

Braces as shown in FIG. 19 may also be stowed and deployed in similar cradles along the length of the frame. In place of the channel iron cradle 501 shown, pipe cradles, slings, and alternate jack heads on the overlever arm may also be used, so that the stowage and deployment system is not limited by the structure shown. Two or three stabilizer systems (marked as 200, 300, and 400 in FIG. 20) may be used, and advantageously, a corresponding stowage system may be built into the frame or attached so as to stow each of the system without the need to carry them to a locker or to store them inside the trailer or the back of a truck towing the trailer, for example.

The cradle bracket extends crosswise on the frame of the trailer or mobile home and has two outside ends which are contralaterally disposed on the beam. Only one end is shown here, but the opposite end is a mirror image of this one. The cradle beam may be part of the frame, form an attachment thereto, or be part of the suspension as shown in FIG. 25, where the cradle is modified to support a rocker arm 511 for a double leaf spring assembly of a pair of tandem axles. A notch is cut in the lower cradle channel to accommodate the pass through of the rocker arm (also termed a suspension "equalizer").

FIG. 24 is a first perspective view of a cradle bracket 501 integrated into the frame 600 of the trailer. An overlever strut 502 is shown in the deployed position with jack pin 507 engaging a detent notch at the outside end of the cradle bracket. The track 503a for receiving the jack pin during stowage is readily visible in this view. The fulcrum pin 105 joining the arms of the lever assembly is also prominent in this underside view, which is a partial view of a cradle beam 520 that spans the frame from side to side (shown here with section marked in FIG. 23). Also marked are the footpad of the strut 510, a stabilizer cable 515, and the upper and lower channel members (504, 505) of the cradle.

FIG. 25 is an alternate perspective view of a cradle bracket integrated into the frame of the trailer. An overlever strut 502 is shown in the deployed position engaging a detent notch at the outside end of the cradle bracket. The view is a partial view of a cradle beam 520 that spans the frame from side to side and is configured to engage the frame and support a center leaf suspension assembly 601 for a pair of tandem axles (112a, 112b). Wheel rims and tires are removed for clarity in the drawing. Any braces of the stabilizer system may also be stowed in a cradle of this construction if desired.

Thus in another aspect the invention can be described as n at-park stabilizer system for a travel trailer, broadly defined, where the stabilizer system comprises a system of struts, optionally with braces, and at least one cradle bracket defining a stowage position for securing the struts or braces under the trailer when not in use. The system includes a) a pair of struts having a right compound strut and a left compound strut, the pair of struts for mounting one on each side of a frame of a trailer, each of the compound struts comprising: i) a base member having a footpad; ii) an extension arm extending from the base member, the extension arm having a footpad end and a head end, wherein the footpad end is hingedly mounted on the base member and a transverse pivot axis is disposed proximate to the head end; iii) an overlever arm pivotably mounted on the transverse pivot axis, the transverse pivot axis defining a fulcrum that divides the overlever arm into a long arm segment comprising a first end and a short arm segment comprising a second end of the overlever arm such that the long arm segment and the short arm segment have a ratio of lengths thereof, the ratio defining a lever with a mechanical advantage when pivoted on the fulcrum, the overlever arm having a cocked position in which the long arm segment is disposed on the fulcrum at an acute pivot angle above the extension arm and a locked position in which the long arm segment is disposed on the fulcrum at essentially a zero pivot angle relative to the extension arm; b) a cradle member rigidly attached to the frame, the cradle member having a span from side to the across the frame and two outside ends contralaterally disposed thereon, wherein the mounting bracket is configured to supportively receive each of the pair of struts in a stowage position under the frame, further wherein the mounting bracket member is configured at the outside ends for engaging the second end of the overlever arm when the pair of struts are in a deployed position.

The pair of struts associated with each cradle bracket are capable of being operated cooperatively, one on each side of a frame of a trailer at an axle or tandem axle, each by setting the footpad on a foundation, engaging the second end of the overlever arm with the mounting bracket, and manually rotating the overlever arm from a cocked position to a locked position, thereby bilaterally lifting weight from the tires of the axle or axles so as to reduce trailer oscillations when the vehicle is at park. The cradle member comprises a lockable mechanism adapted for securing said struts in said stowed position when not deployed.

In other aspects, the lever assembly is configured to supply a mechanical advantage of 5 to 20 when levered on the fulcrum pin 105. Preferably the overarm arm is provided with a internal channel having inside dimensions enabled to enclose said extension arm in said locked position so as to be more compact for stowing. The fulcrum has an adjustable height that may be varied according to the tire height and any variation in the foundational surface. And optionally, the struts may have a tubular section with telescoping insert, including a lockable mechanism enabled to telescopingly adjust the length above said base member, again for varying the strut length as needed.

WORKING EXAMPLE

In a working example, an ADVANTAGE® 345 BHTS trailer (Fleetwood, Decatur Ind.) having a gross vehicle weight of 5.2 Tons, a length of 39 feet, and a double axle with 235/65-R16 tires filled to 80 psi, was parked on an industrial vehicle scale and the struts were set up on either side of the center axle so that the footpads of the struts rested off the scale platform. To actuate the struts, the overlever arm was engaged with the mounting bracket hardware at essentially a horizontal angle, the extension arm was seated on its footpad at about a 30 to 38 degree angle, and the overlever arm was then rotated into the locked position so that the extension arm was enclosed within the internal channel (FIG. 10B, 204c) of the extension arm.

The scale reading before and after engaging the struts is an indication of the amount of weight transferred from the tires to the strut members. We measured this and found a surprisingly large weight difference. A weight of 2820 pounds was transferred off the tires after installation and actuation of an above-axle strut system 200, or about 27% of the gross weight of the vehicle. This was sufficient to provide a substantial reduction in trailer motion in use.

Furthermore, when the struts were actuated, the trailer was observed to rise about an inch at the wheel wells, a substantial change. Having secured the trailer in this way, our experience shows that persons walking around inside the trailer experienced little or no trailer oscillations such as occur in the trailer without the stabilizer system of the invention.

A second pair of struts was then installed at the rear of the vehicle. A rear strut stabilizing system 300 was installed and the trailer was again weighed. The footpads of the rear struts were positioned off the scale on solid footing. Surprisingly, an additional 800 pounds of gross vehicular weight was "lost" from the vehicle as evidenced by the scale readings. Thus the total shift in vehicle weight from the tires to the struts was 3620 pounds using a combination of an above-axle and a rear stabilizer system. About 27% of the weight was relieved from the tires using the above-axle strut system 200 and an additional 7.7% was relieved when the rear stabilizer system 300 was used in combination. The total reduction in weight of the trailer before the struts were engaged was 35% of the gross vehicular weight. Before use of the struts, the trailer weight was 10,400 pounds; after engagement and activation of the struts, the "apparent" trailer weight was only 6980 pounds. Each strut was actuated with only one hand but the reduction in trailer motion was remarkable. This is a surprising finding and an advance in the art.

While the above is a complete description of selected embodiments of the present invention, it is possible to practice the invention using various alternatives, modifications, combinations and equivalents.

The various features of novelty and non-obviousness that characterize the invention are pointed out with particularity in the claims annexed to and forming part of this disclosure. The invention does not necessarily reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. In general, in the following claims, the terms used in the written description should not be construed to limit the claims to specific embodiments described herein for illustration, but should be construed to include all possible embodiments, both specific and generic, along with the full scope of equivalents to which such claims are entitled.

It is important, therefore, that the claims be regarded as including such equivalent constructions insofar as they do not depart from the spirit and scope of the present invention. Accordingly, the claims are not limited by the disclosure.

What is claimed is:

1. An at-park stabilizer system for a travel trailer, said stabilizer system comprising a pair of struts defining a right compound strut and a left compound strut, said pair of struts for mounting one on each side of a frame of a trailer at an axle or a pair of tandem axles, each of said compound struts comprising:
   a) a base member having a footpad;
   b) an extension arm extending from said base member, said extension arm having a foot end and a head end, wherein said foot end is hingedly mounted on said base member and a transverse pivot axis is disposed proximate to said head end;
   c) an overlever arm pivotably mounted on said transverse pivot axis, said transverse pivot axis defining a fulcrum that divides the overlever arm into a long arm segment comprising a first end and a short arm segment comprising a second end of said overlever arm such that said long arm segment and said short arm segment have a ratio of lengths thereof, said ratio defining a lever with a mechanical advantage when pivoted on said fulcrum, said overlever arm having a cocked position in which said long arm segment is disposed on said fulcrum at an acute pivot angle above said extension arm and a locked position in which said long arm segment is disposed on said fulcrum at essentially a zero pivot angle relative to said extension arm;
   d) a mounting bracket member enabled to rigidly attach to said trailer frame proximate to said axle or pair of tandem axles; wherein said mounting bracket member is configured for engaging said second end of said overlever arm; and, wherein said pair of struts are capable of being operated cooperatively, one on each side of said frame at an axle or pair of tandem axles.

2. The stabilizer system of claim 1, wherein said lever is configured to supply a mechanical advantage of 5 to 20 when pivoted on said fulcrum.

3. The stabilizer system of claim 1, wherein the overarm arm comprises an internal channel having inside dimensions enabled to enclose said extension arm in said locked position.

4. The stabilizer system of claim 1, wherein said fulcrum has an adjustable height.

5. The stabilizer system of claim 4, wherein said extension arm is telescopically extensible above said base member.

6. The stabilizer system of claim 1, further comprising a pair of anti-slip tension members, each tension member being reversibly attachable so as to crisscross between said right compound strut and said left compound strut.

7. The stabilizer system of claim 6, wherein each said tension member has an adjustable length for ensuring that the footpads do not slip.

8. The stabilizer system of claim 7, wherein each said tension member comprises cable with chain link endpiece adapted to be affixed to a slot in said base member.

9. The stabilizer system of claim 1, wherein said extension arm nests within a channel in said long arm segment of said overlever arm when in said locked position.

10. The stabilizer system of claim 1, wherein said mounting bracket member is adapted to mount to a frame of a travel trailer between a tandem pair of axles, each axle having a set of leaf springs, such that the mounting bracket member engages the frame at a midpoint between the leaf springs.

11. The stabilizer system of claim 1, further comprising a rear stabilizer system having a right compound rear strut, a left compound rear strut, and a mounting system enabled to engage said struts with said trailer frame.

12. The stabilizer system of claim 11, wherein the rear stabilizer system comprises a lever system having means for applying a mechanical advantage.

13. The stabilizer system of claim 11, further comprising a pair of tension members, each tension member being reversibly attachable so as to crisscross between said right rear strut and said left rear strut.

14. The stabilizer system of claim 1, further comprising a right forward brace and a length left forward brace.

15. The stabilizer system of claim 14, further comprising a pair of tension members, each tension member being reversibly attachable so as to crisscross between said right forward brace and said left forward brace.

16. The stabilizer system of claim 14, wherein said forward braces comprise a tubular section with telescoping insert, said braces having a lockable mechanism enabled to telescopingly adjust the length.

17. The stabilizer system of claim 1, wherein said stabilizer system comprises supporting hardware adapted for stowing said struts during travel.

18. An at-park stabilizer system for a travel trailer, said stabilizer system comprising
   a) a pair of struts having a right compound strut and a left compound strut, said pair of struts for mounting one on each side of a frame of a trailer, each of said compound struts comprising:
      i) a base member having a footpad;
      ii) an extension arm extending from said base member, said extension arm having a foot end and a head end, wherein said foot end is hingedly mounted on said base member and a transverse pivot axis is disposed proximate to said head end;

iii) an overlever arm pivotably mounted on said transverse pivot axis, said transverse pivot axis defining a fulcrum that divides the overlever arm into a long arm segment comprising a first end and a short arm segment comprising a second end of said overlever arm such that said long arm segment and said short arm segment have a ratio of lengths thereof, said ratio defining a lever with a mechanical advantage when pivoted on said fulcrum, said overlever arm having a cocked position in which said long arm segment is disposed on said fulcrum at an acute pivot angle above said extension arm and a locked position in which said long arm segment is disposed on said fulcrum at essentially a zero pivot angle relative to said extension arm;

b) a cradle bracket rigidly attached to said frame, said cradle bracket having a span from side to said across said frame and two outside ends contralaterally disposed thereon, wherein said cradle bracket is configured to supportingly receive each of said pair of struts in a stowage position under said frame, further wherein said cradle bracket is configured at said outside ends for engaging said second end of said overlever arm when said pair of struts are in a deployed position; and, wherein said pair of struts are capable of being operated cooperatively when deployed and engaged on said outside ends of said cradle member, one on each side of said frame, for opposing oscillatory motion of a trailer on its tires.

19. The stabilizer system of claim 18, wherein said lever is configured to supply a mechanical advantage of 5 to 20 when levered on said fulcrum.

20. The stabilizer system of claim 18, wherein the overarm arm comprises an internal channel having inside dimensions enabled to enclose said extension arm in said locked position.

21. The stabilizer system of claim 18, wherein said fulcrum has an adjustable height.

22. The stabilizer system of claim 18, wherein said struts comprise a tubular section with telescoping insert, said struts having a lockable mechanism enabled to telescopingly adjust the length above said base member.

23. The stabilizer system of claim 18, wherein said cradle member comprises a lockable mechanism adapted for securing said struts in said stowed position when not deployed.

* * * * *